US012107666B2

(12) United States Patent
Zhou et al.

(10) Patent No.: US 12,107,666 B2
(45) Date of Patent: *Oct. 1, 2024

(54) PORT DETECTION METHOD, OPTICAL NETWORK DEVICE, AND PASSIVE OPTICAL NETWORK SYSTEM

(71) Applicant: Huawei Technologies Co., Ltd., Shenzhen (CN)

(72) Inventors: Enyu Zhou, Dongguan (CN); Lei Jing, Wuhan (CN); Xiaofei Zeng, Dongguan (CN); Huafeng Lin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,492

(22) Filed: Apr. 22, 2022

(65) Prior Publication Data

US 2022/0247507 A1  Aug. 4, 2022

Related U.S. Application Data

(63) Continuation of application No. PCT/CN2020/111015, filed on Aug. 25, 2020.

(30) Foreign Application Priority Data

Oct. 23, 2019 (CN) .......................... 201911013929.7
Mar. 24, 2020 (CN) .......................... 202010212535.0

(51) Int. Cl.
*H04J 14/00* (2006.01)
*H04J 14/02* (2006.01)

(52) U.S. Cl.
CPC ...... *H04J 14/0204* (2013.01); *H04J 14/0245* (2013.01); *H04J 14/0258* (2013.01); *H04J 14/0267* (2013.01)

(58) Field of Classification Search
CPC .... H04B 10/27; H04B 10/40; H04B 10/0795; H04B 10/2507; H04B 10/07955;
(Continued)

(56) References Cited

U.S. PATENT DOCUMENTS 8,811,820 B2 * 8/2014 Dahlfort ............. H04J 14/0267
398/100
9,438,513 B2 * 9/2016 Gronvall .............. G02B 6/4251
(Continued)

FOREIGN PATENT DOCUMENTS

CN      102118658 A    7/2011
CN      103002359 A    3/2013
(Continued)

*Primary Examiner* — Hanh Phan
(74) *Attorney, Agent, or Firm* — Leydig, Voit & Mayer, Ltd.

(57) ABSTRACT

This application provides a port detection method, an optical network device, and a passive optical network system, to quickly and accurately detect a port connected to an ONU, and improve efficiency of determining the port connected to the ONU. The method includes: an optical line terminal sends optical signals corresponding to all of N wavelengths to at least one optical network unit, where the N wavelengths are different from each other, and N is a positive integer; the OLT receives optical power values that are of the optical signals corresponding to all of the N wavelengths and that are sent by a first ONU, where the first ONU is any one of the at least one ONU; and the OLT determines, bases on the optical power values of the optical signals corresponding to all of the N wavelengths, information about an optical splitter port corresponding to the first ONU.

20 Claims, 9 Drawing Sheets

(58) Field of Classification Search
CPC .............. H04J 14/0204; H04J 14/0258; H04J 14/0267; H04J 14/0245; H04J 14/02; H04Q 11/0067
USPC ........ 398/66, 67, 68, 69, 70, 71, 72, 79, 82, 398/100, 135, 136, 158, 159, 33, 38, 16, 398/10, 13, 17, 20; 370/352, 392, 389, 370/468, 395.31
See application file for complete search history.

(56) References Cited

U.S. PATENT DOCUMENTS

| | | | |
|---|---|---|---|
| 2006/0110161 A1* | 5/2006 | Cho | ............... H04J 14/0246 398/72 |
| 2014/0233954 A1 | 8/2014 | Lee et al. | |
| 2017/0111119 A1* | 4/2017 | Yoo | .................. H04J 14/08 |
| 2023/0079705 A1* | 3/2023 | Lin | .................. H04B 10/272 398/58 |

FOREIGN PATENT DOCUMENTS

| | | |
|---|---|---|
| CN | 103281605 A | 9/2013 |
| CN | 105337656 A | 2/2016 |
| CN | 105352594 A | 2/2016 |
| CN | 108512595 A | 9/2018 |
| CN | 110933531 A | 3/2020 |
| CN | 111327975 A | 6/2020 |
| EP | 1701580 A2 | 9/2006 |
| EP | 3242424 A1 | 11/2017 |
| JP | H1022948 A | 1/1998 |
| JP | 2006203823 A | 8/2006 |
| JP | 2006292917 A | 10/2006 |
| JP | 2016524396 A | 8/2016 |
| WO | 2018058624 A1 | 4/2018 |

* cited by examiner

PORT DETECTION METHOD, OPTICAL NETWORK DEVICE, AND PASSIVE OPTICAL NETWORK SYSTEM

CROSS-REFERENCE TO RELATED APPLICATIONS

This application is a continuation of International Application No. PCT/CN2020/111015, filed on Aug. 25, 2020, which claims priority to Chinese Patent Application No. 201911013929.7, filed on Oct. 23, 2019 and Chinese Patent Application No. 202010212535.0, filed on Mar. 24, 2020. All of the aforementioned patent applications are hereby incorporated by reference in their entireties.

TECHNICAL FIELD

Embodiments of this application relate to the communications field, and in particular, to a port detection method, an optical network device, and a passive optical network system.

BACKGROUND

A passive optical network (PON) system includes at least three types of devices: an optical line terminal (OLT), an optical distribution network (ODN), and an optical network unit (ONU). The ODN may include one or more optical splitters, and the one or more optical splitters are further classified into one or more levels of optical splitters. For example, a first-level optical splitter includes an optical splitter 1, and the optical splitter 1 equally splits power of a received optical signal and separately transmits the optical signal to an optical splitter 2 and an optical splitter 3 that are connected to output ends of the optical splitter. The optical splitter 2 and the optical splitter 3 are second-level optical splitters. Then, the optical splitter 2 and the optical splitter 3 each equally split power of the received optical signal and each transmit the optical signal to a connected ONT. An output end of a last-level optical splitter in the ODN is used as an output port of the ODN, and the ONT is connected to the output port of the ODN.

However, a carrier or a central office (CO) cannot learn of an ODN port to which each ONU is connected, or can determine, only through manual recording, an ODN port to which each ONU is connected. Therefore, how to accurately determine an ODN port connected to an ONU becomes an urgent problem to be resolved.

SUMMARY

This application provides a port detection method, an optical network device, and a passive optical network system, to quickly and accurately detect a port connected to an ONU, and improve efficiency of determining the port connected to the ONU.

In view of this, a first aspect of this application provides a port detection method, including:

an OLT receives optical power values that are of optical signals corresponding to all of N wavelengths and that are sent by a first ONU, where the N wavelengths are wavelengths of optical signals received by the first ONU, the N wavelengths are different from each other, and N is a positive integer; and the OLT determines, based on the optical power values of the optical signals corresponding to all of the N wavelengths, information about an optical splitter port corresponding to the first ONU.

Therefore, in this implementation of this application, after receiving optical signals corresponding to the N wavelengths, each of at least one ONU may determine optical power values of the optical signals corresponding to all of the N wavelengths, and feed back optical power values of the optical signals corresponding to all of the N wavelengths to the OLT. The optical signals corresponding to the N wavelengths may be all or some of optical signals received by each ONU. The OLT may determine, based on the optical power values that are of the optical signals corresponding to all of the N wavelengths and that are fed back by each ONU, information about an optical splitter port corresponding to each ONU. Therefore, the OLT can accurately determine, based on the optical power values that are of the optical signals corresponding to all of the N wavelengths and that are fed back by the ONU, the information about the optical splitter port corresponding to each ONU.

Optionally, after receiving the optical signals corresponding to the N wavelengths, the first ONU may send the optical power values of the optical signals corresponding to all of the N wavelengths to the OLT: or after receiving optical signals corresponding to one or more of the N wavelengths, the first ONU may send optical power values of the received one or more optical signals to the OLT.

Optionally, in a possible implementation, the optical signals that are of all of the N wavelengths and that are received by the first ONU may be sent by the OLT to the first ONU, for example, a laser or a tunable laser is integrated into the OLT: or the optical signals that are of all of the N wavelengths and that are received by the first ONU may be sent by an independently disposed laser to the first ONU. Therefore, in this implementation of this application, the optical signals corresponding to the N wavelengths may be sent to the first ONU in a plurality of manners.

Optionally, in a possible implementation, if N is greater than K, that the OLT determines, based on the optical power values of the optical signals corresponding to all of the N wavelengths, information about an optical splitter port corresponding to the first ONU may include:

if differences between optical power values of the optical signals corresponding to the N wavelengths include a difference greater than a threshold, the OLT determines K smallest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and K is a positive integer: the OLT determines optical signal wavelengths that are in a one-to-one correspondence with the K optical power values, to obtain K wavelengths: and the OLT determines, based on the K wavelengths, the information about the optical splitter port corresponding to the first ONU.

In this implementation of this application, the OLT may determine the K smallest optical power values from the optical power values that are of the optical signals corresponding to the N wavelengths and that are fed back by the first ONU, and determine, based on the K optical power values, the information about the optical splitter port corresponding to the first ONU. Therefore, in this application, the information about the optical splitter port corresponding to the first ONU can be accurately determined by using the smallest optical power values. Compared with manual recording, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, K is not 0, and optical signals corresponding to the K wavelengths are transmitted to the first ONU by using an optical distribution network (ODN), at least one optical splitter is disposed in the ODN, a reflection point is disposed at each of a plurality of branch ends of each of the at least one optical splitter, the reflection point is configured to reflect an optical signal of a first preset wavelength, and the plurality of branch ends are all or some of branch ends of each optical splitter: and that the OLT determines, based on the K wavelengths, the information about the optical splitter port corresponding to the first ONU may include: The OLT determines information about at least K reflection points based on the K wavelengths, where the at least K reflection points reflect the optical signals corresponding to the K wavelengths, and each of the at least K reflection points reflects an optical signal of one of the K wavelengths: and the OLT determines, based on the information about the at least K reflection points, the information about the optical splitter port corresponding to the first ONU.

In this implementation of this application, the provided method may be applied to a PON system. The PON system may include the OLT and the ODN, the ODN may include the at least one optical splitter, reflection points are disposed at the plurality of branch ends of each of the at least one optical splitter, and the reflection point may be configured to reflect the optical signal of the first preset wavelength, to reduce an optical power value of the optical signal of the first preset wavelength, so that the optical power value of the optical signal received by the first ONU is less than an optical power value of an optical signal that is not reflected by a reflection point, and then the information about the optical splitter port corresponding to the first ONU is determined. Therefore, in this implementation of this application, the reflection points are disposed at the plurality of branch ends of the optical splitter, to partially reflect the optical signal of the first preset wavelength to reduce optical power values of the optical signal that is of the first preset wavelength and that is received by the first ONU, so that the OLT can identify, based on the K wavelengths that are in a one-to-one correspondence with the K smallest optical power values, specific wavelengths whose optical signals are reflected by reflection points, to obtain the information about the at least K reflection points corresponding to the K wavelengths, and then accurately determine the information about the optical splitter port corresponding to the first ONU. Compared with manually recording a port number, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, if N is greater than L, that the OLT determines, based on the optical power values of the optical signals corresponding to all of the N wavelengths, information about an optical splitter port corresponding to the first ONU may include:

if differences between optical power values of the optical signals corresponding to the N wavelengths include a difference greater than a threshold, the OLT determines L largest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and L is a positive integer: the OLT determines optical signal wavelengths that are in a one-to-one correspondence with the L optical power values, to obtain L wavelengths; and the OLT determines, based on the L wavelengths, the information about the optical splitter port corresponding to the first ONU.

In this implementation of this application, information about an optical splitter port directly or indirectly connected to the first ONU can be determined by selecting the largest optical power values. Compared with manual recording, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, optical signals corresponding to the L wavelengths are transmitted to the first ONU by using an optical distribution network (ODN), at least one optical splitter is disposed in the ODN, transmittance points are disposed at a plurality of branch ends of each of the at least one optical splitter, and the transmittance point is configured to transmit an optical signal of a second preset wavelength; and that the OLT determines, based on the L wavelengths, the information about the optical splitter port corresponding to the first ONU may include: The OLT determines information about at least one transmittance point based on information about the L wavelengths that is fed back by the first ONU, where the at least one transmittance point transmits the optical signals corresponding to the L wavelengths: and the OLT determines, based on the information about the at least one transmittance point, the information about the optical splitter port corresponding to the first ONU.

The method provided in this application may be applied to a PON system. The PON system may include the OLT and the ODN, the ODN may include the at least one optical splitter, each of the at least one optical splitter has at least one branch end, the transmittance points are disposed at the plurality of branch ends, and the transmittance point may be configured to transmit the optical signal of the second preset wavelength and reflect an optical signal that is not of the second preset wavelength, to reduce an optical power value of the optical signal that is not of the second preset wavelength, so that an optical power value of the optical signal received by the first ONU is larger than the optical power value of the reflected optical signal, and then the information about the optical splitter port corresponding to the first ONU is determined. Therefore, in this implementation of this application, a transmittance point is disposed at each of the plurality of branch ends of the optical splitter, to transmit only the optical signal of the second preset wavelength, to enable the optical power value of the optical signal of the second preset wavelength to be larger than an optical power value of an optical signal of another wavelength, so that the OLT can identify, based on the K wavelengths that are in a one-to-one correspondence with the L largest optical power values, specific wavelengths whose optical signals are transmitted by transmittance points, to obtain the information about the at least L transmittance points corresponding to the L wavelengths, and then accurately determine the information about the optical splitter port corresponding to the first ONU. Compared with manually recording a port number, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, if N is greater than K or N is greater than L, and none of the differences between the optical power values of the optical signals corresponding to the N wavelengths is greater than the threshold, the OLT determines that the optical splitter port corresponding to the first ONU is included in at least one preset port, and the at least one preset port is a port of at least one optical splitter. For example, when no reflection point is disposed on the optical splitter port connected to the first ONU, the optical power values of the optical signals that are of all of the N wavelengths and that are received by the first ONU approximate to each other or are the same. Therefore, the differences between the optical power values of the optical signals corresponding to the N wavelengths are relatively small and are less than the threshold. In this case, it can be determined that the port connected to the first ONU is a port on which no reflection point is disposed.

In a possible implementation, N may be equal to K or N is equal to L. In this case, the OLT may directly determine, based on the N wavelengths and a preset mapping relationship between a wavelength and a port, the information about the optical splitter port corresponding to the first ONU. Therefore, in this implementation of this application, the first ONU may determine the K smallest optical power values or the L largest optical power values of the received optical signals. The OLT does not need to perform selection, and the ONU directly feeds back the K optical power values, the L optical power values, the K wavelengths, or the L wavelengths to the OLT, thereby reducing a workload of the OLT.

Alternatively, the OLT may directly receive the K wavelengths or the L wavelengths that are fed back by the first ONU, to determine, based on the received K wavelengths or L wavelengths and the mapping relationship between a wavelength and a port, the information about the optical splitter port corresponding to the first ONU.

Optionally, in a possible implementation, a first optical signal received by the first ONU includes a primary signal and a secondary signal, and an optical power value of the primary signal is greater than an optical power value of the secondary signal. For example, if the ODN includes a first-level optical splitter and a second-level optical splitter, the first optical signal is transmitted to the first ONU by using the first-level optical splitter and the second-level optical splitter, and the first ONU receives the primary signal of the first optical signal. In addition, after passing through the first-level optical splitter, the first optical signal is reflected to the first-level optical splitter from the second-level optical splitter: and then is reflected by the first-level optical splitter, and is transmitted to the first ONU after passing through the second-level optical splitter, so that the first ONU receives the secondary signal of the first optical signal. The first optical signal is an optical signal corresponding to one of the K wavelengths: and that the OLT determines K smallest optical power values from the optical power values of the optical signals corresponding to the N wavelengths may include: The OLT determines, based on the optical power value of the primary signal of the first optical signal, the K smallest optical power values from the optical power values of the optical signals corresponding to the N wavelengths.

In this implementation of this application, the first ONU may receive the primary signal and the secondary signal of the first optical signal, the optical power value of the primary signal is greater than the optical power value of the secondary signal, and the primary signal is received by the first ONU before the secondary signal. The OLT determines the K optical power values based on the optical power value of the primary signal, without reference to the optical power value of the secondary signal, so that a quantity of determined optical power values can be prevented from being excessive, thereby improving accuracy of determining the optical splitter port corresponding to the first ONU.

Optionally, in a possible implementation, the port information includes information about a first port corresponding to the first optical signal, the information about the first port corresponding to the first optical signal is determined by the OLT based on information about the secondary signal, and the information about the secondary signal is sent by the first ONU to the OLT. In this implementation of this application, the ONU may send the information about the secondary signal of the received first optical signal to the OLT, where the information about the secondary signal is, for example, the optical power value of the secondary signal or indication information that indicates that the first optical signal has the secondary signal, so that the OLT can determine, based on the information about the secondary signal and the K optical power values, the information about the port corresponding to the first optical signal, so that the information about the optical splitter port corresponding to the first ONU can be more accurately determined. Therefore, after the K smallest optical power values are determined based on the optical power value of the primary signal, the information about the port corresponding to the first optical signal can be further determined based on the information about the secondary signal. Compared with manually recording a port number, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, that the optical line terminal (OLT) sends the optical signals corresponding to all of the N wavelengths to the at least one optical network unit (ONU) may include: The OLT sends indication information, where the indication information is used to indicate a laser to send a second optical signal, the indication information includes information about a wavelength of the second optical signal, and the second optical signal is an optical signal corresponding to any one of the N wavelengths. In this implementation of this application, the OLT may send the indication information to control the laser to send an optical signal of any one of the N wavelengths, and the indication information further carries information about the corresponding wavelength, so that the laser can accurately send an optical signal of each wavelength.

Optionally, in a possible implementation, before the OLT sends the indication information, the method may further include: The OLT sends the information about the wavelength of the second optical signal to the at least one ONU.

In this implementation of this application, the OLT may send information about all of the N wavelengths to the at least one ONU, including the information about the wavelength of the second optical signal, so that the at least one ONU can accurately receive the second optical signal.

Optionally, in a possible implementation, the method further includes: The OLT receives identification information of the first ONU that is sent by the first ONU. In this implementation of this application, the first ONU may send the OLT the identification information of the first ONU, for example, an identification number of the first ONU, a device name of the first ONU, or a sequence number of the first ONU, so that the OLT can identify the first ONU. An identifier of the first ONU may be carried in information for sending the optical power values, or may be separately sent to the OLT.

A second aspect of this application provides a port detection method, including: an optical network unit (ONU) receives optical signals corresponding to all of N wavelengths, where the N wavelengths are different from each other, and N is a positive integer; the ONU determines optical power values of the received optical signals corresponding to all of the N wavelengths: the ONU generates at least one piece of feedback information based on the optical power values of the optical signals corresponding to all of the N wavelengths: and the ONU sends the at least one piece of feedback information to an optical line terminal (OLT), so that the OLT determines, based on the at least one piece of feedback information, information about an optical splitter port corresponding to the ONU. In this implementation of this application, the ONU may receive the optical signals corresponding to all of the N wavelengths, generate the at least one piece of feedback information based on the optical power values of the optical signals corresponding to all of the N wavelengths, and send the at least one piece of feedback information to the OLT, so that the OLT can accurately determine, based on the at least one piece of feedback information, the information about the optical splitter port corresponding to the ONU. Compared with manually recording a port number, in this application, the optical splitter port corresponding to the ONU can be accurately detected, to improve port information accuracy, and improve port detection efficiency.

In addition to receiving the optical signals corresponding to all of the N wavelengths, the ONU may alternatively receive optical signals corresponding to more wavelengths. It may be understood that optical signals corresponding to the N wavelengths may be all or some of optical signals received by the ONU.

Optionally, in a possible implementation, the at least one piece of feedback information includes the optical power values of the optical signals corresponding to all of the N wavelengths, so that the OLT can determine, based on the optical power values of all of the N wavelengths, the information about the optical splitter port corresponding to the ONU.

In a possible implementation, if N is greater than K, the at least one piece of feedback information may include K smallest optical power values or K wavelengths corresponding to the K smallest optical power values. In this implementation of this application, the OLT may determine, based on the K wavelengths corresponding to the K smallest optical power values and a preset mapping relationship between a wavelength and a port, the optical splitter port corresponding to the ONU, without performing selection from optical power values of the N optical signals, thereby reducing a workload of the OLT.

In a possible implementation, if N is greater than L, the at least one piece of feedback information may include L largest optical power values or L wavelengths corresponding to the L largest optical power values. In this implementation of this application, the OLT may determine, based on the L wavelengths corresponding to the L largest optical power values and a preset mapping relationship between a wavelength and a port, the optical splitter port corresponding to the ONU, without performing selection from optical power values of the N optical signals, thereby reducing a workload of the OLT.

In a possible implementation, the at least one piece of feedback information may include a sequence number of the optical splitter port corresponding to the ONU. In this implementation of this application, the OLT delivers a preset mapping relationship between a wavelength and a port to the ONU. The ONU determines corresponding K or L wavelengths based on K smallest optical power values or L largest optical power values: and then determines the corresponding optical splitter port based on the mapping relationship between a wavelength and a port, and feeds back the sequence number of the corresponding optical splitter port to the OLT. The OLT does not need to perform selection, thereby reducing a workload of the OLT.

Optionally, in a possible implementation, the optical signals that are of all of the N wavelengths and that are received by the ONU may be sent by the OLT to the ONU, for example, a laser or a tunable laser is integrated into the OLT: or the optical signals that are of all of the N wavelengths and that are received by the ONU may be sent by an independently disposed laser to the ONU. Therefore, in this implementation of this application, the optical signals corresponding to the N wavelengths may be sent to the ONU in a plurality of manners. Optionally, in a possible implementation, if N is greater than K, that the ONU generates at least one piece of feedback information based on the optical power values of the optical signals corresponding to all of the N wavelengths may include:

if differences between the optical power values of the optical signals corresponding to the N wavelengths include a difference greater than a threshold, the ONU determines K smallest optical power values from the optical power values of the optical signals corresponding to the N wavelengths, where the optical power values of the optical signals corresponding to the N wavelengths include the optical power values of the optical signals that are of all of the N wavelengths and that are received by the ONU, and K is a positive integer; the ONU determines optical signal wavelengths that are in a one-to-one correspondence with the K optical power values, to obtain K wavelengths: the ONU determines, based on the K wavelengths, the information about the optical splitter port corresponding to the ONU: and the ONU generates the at least one piece of feedback information, where the at least one piece of feedback information includes the information about the optical splitter port corresponding to the ONU. In this implementation of this application, the ONU may determine the information about the optical splitter port corresponding to the ONU, and send the information about the optical splitter port corresponding to the ONU to the OLT, so that the OLT can accurately determine the information about the port corresponding to the ONU, and a workload of the OLT is reduced.

Optionally, in a possible implementation, optical signals corresponding to the K wavelengths are transmitted to the ONU by using an optical distribution network (ODN), at least one optical splitter is disposed in the ODN, a reflection point is disposed at each of a plurality of branch ends of each of the at least one optical splitter, the plurality of branch ends are all or some of branch ends of each optical splitter, and the reflection point is configured to reflect an optical signal of a first preset wavelength: and that the ONU determines, based on the K wavelengths, the information about the optical splitter port corresponding to the ONU may include: the ONU determines information about at least K reflection points based on the K wavelengths, where the at least K reflection points reflect the optical signals corresponding to the K wavelengths, and each of the at least K reflection points reflects an optical signal corresponding to one of the K wavelengths: and the ONU determines, based on the information about the at least K reflection points, the information about the optical splitter port corresponding to the ONU.

In this implementation of this application, the provided method may be applied to a PON system. The PON system may include the ODN, the ODN may include the at least one optical splitter, each of the at least one optical splitter has at least one branch end, reflection points are disposed at all or some branch ends, and the reflection point may be configured to reflect the optical signal of the first preset wavelength, to reduce an optical power value of the optical signal of the first preset wavelength, so that the optical power value of the optical signal received by the ONU is less than an optical power value of an optical signal that is not reflected by a reflection point, and then the information about the optical splitter port corresponding to the ONU is determined.

Optionally, in a possible implementation, a first optical signal includes a primary signal and a secondary signal, an optical power value of the primary signal is greater than an optical power value of the secondary signal, and the first optical signal is an optical signal of one of the K wavelengths: and that the ONU determines K smallest optical power values from the optical power values of the optical signals corresponding to the N wavelengths may include: The ONU determines, based on the optical power value of the primary signal of the first optical signal, the K smallest optical power values from the optical power values of the optical signals corresponding to the N wavelengths.

Optionally, in a possible implementation, if N is greater than L, that the ONU generates at least one piece of feedback information based on the optical power values of the optical signals corresponding to all of the N wavelengths may include: if differences between the optical power values of the optical signals corresponding to the N wavelengths include a difference greater than a threshold, the ONU determines L largest optical power values from the optical power values of the optical signals corresponding to the N wavelengths, where the optical power values of the optical signals corresponding to the N wavelengths include the optical power values of the optical signals that are of all of the N wavelengths and that are received by the ONU, and L is a positive integer: the ONU determines optical signal wavelengths that are in a one-to-one correspondence with the L optical power values, to obtain L wavelengths: and the ONU determines, based on the L wavelengths, the information about the optical splitter port corresponding to the ONU.

In this implementation of this application, information about an optical splitter port directly or indirectly connected to the ONU can be determined by selecting the largest optical power values. Compared with manual recording, in this application, accuracy of determining the optical splitter port corresponding to the ONU can be significantly improved, and port detection efficiency can be improved. Even if the ONU replaces a connected port, the ONU can accurately determine, in a timely manner, information about an optical splitter port corresponding to the ONU.

Optionally, in a possible implementation, optical signals corresponding to the L wavelengths are transmitted to the ONU by using an optical distribution network (ODN), at least one optical splitter is disposed in the ODN, transmittance points are disposed at a plurality of branch ends of each of the at least one optical splitter, and the transmittance point is configured to transmit an optical signal of a second preset wavelength: and that the ONU determines, based on the L wavelengths, the information about the optical splitter port corresponding to the ONU may include: The ONU determines information about at least one transmittance point based on information about the L wavelengths that is fed back by the ONU, where the at least one transmittance point transmits the optical signals corresponding to the L wavelengths: and the ONU determines, based on the information about the at least one transmittance point, the information about the optical splitter port corresponding to the ONU.

The method provided in this application may be applied to a PON system. The PON system may include the ONU and the ODN, the ODN may include the at least one optical splitter, each of the at least one optical splitter has at least one branch end, the transmittance points are disposed at the plurality of branch ends, and the transmittance point may be configured to transmit the optical signal of the second preset wavelength and reflect an optical signal that is not of the second preset wavelength, to reduce an optical power value of the optical signal that is not of the second preset wavelength, so that an optical power value of the optical signal received by the ONU is larger than the optical power value of the reflected optical signal, and then the information about the optical splitter port corresponding to the ONU is determined. Therefore, in this implementation of this application, a transmittance point is disposed at each of the plurality of branch ends of the optical splitter, to transmit only the optical signal of the second preset wavelength, to enable the optical power value of the optical signal of the second preset wavelength to be larger than an optical power value of an optical signal of another wavelength, so that the ONU can identify, based on the K wavelengths that are in a one-to-one correspondence with the L largest optical power values, specific wavelengths whose optical signals are transmitted by transmittance points, to obtain the information about the at least L transmittance points corresponding to the L wavelengths, and then accurately determine the information about the optical splitter port corresponding to the ONU. Compared with manually recording a port number, in this application, accuracy of determining the optical splitter port corresponding to the ONU can be significantly improved, and port detection efficiency can be improved. Even if the ONU replaces a connected port, the ONU can accurately determine, in a timely manner, the information about the optical splitter port corresponding to the ONU.

Optionally, in a possible implementation, if none of the differences between the optical power values of the optical signals corresponding to the N wavelengths is greater than the threshold, the ONU determines that the optical splitter port corresponding to the ONU is included in at least one preset port, and the at least one preset port is a port of at least one optical splitter. For example, when no reflection point or transmittance point is disposed on the optical splitter port connected to the first ONU, the optical power values of the optical signals that are of all of the N wavelengths and that are received by the first ONU approximate to each other or are the same. Therefore, the differences between the optical power values of the optical signals corresponding to the N wavelengths are relatively small and are less than the threshold. In this case, it can be determined that the port connected to the first ONU is a port on which no reflection point or transmittance point is disposed.

In this implementation of this application, the first ONU may receive the primary signal and the secondary signal of the first optical signal, the optical power value of the primary signal is greater than the optical power value of the secondary signal, and the primary signal is received by the first ONU before the secondary signal. The ONU determines the K optical power values based on the optical power value of the primary signal, without reference to the optical power value of the secondary signal, so that a quantity of determined optical power values can be prevented from being excessive, thereby improving accuracy of determining the optical splitter port corresponding to the first ONU.

Optionally, in a possible implementation, the port information includes information about a first port corresponding to the first optical signal, the information about the first port corresponding to the first optical signal is determined by the ONU based on information about the secondary signal, and the information about the secondary signal is sent by the first ONU to the OLT. In this implementation of this application, the ONU may determine, based on the information about the secondary signal, the information about the port corresponding to the first optical signal, so that the information about the optical splitter port corresponding to the ONU can be accurately determined. Therefore, after the K smallest optical power values are determined based on the optical power value of the primary signal, the information about the port corresponding to the first optical signal can be further determined based on the information about the secondary signal.

Optionally, in a possible implementation, before the ONU receives the optical signals corresponding to all of the N wavelengths, the method may further include: The ONU receives information that is about a wavelength of a second optical signal and that is sent by the OLT, where the second optical signal is an optical signal of any one of the N wavelengths. In this implementation of this application, the OLT may send information about all of the N wavelengths to the at least one ONU, including the information about the wavelength of the second optical signal, so that the at least one ONU can accurately receive the second optical signal.

Optionally, in a possible implementation, the method may further include: The ONU sends identification information of the ONU to the OLT. In this implementation of this application, the ONU may send the OLT the identification information of the ONU, for example, an identification number of the ONU, a name of the ONU, or a sequence number of the ONU, so that the OLT can identify the ONU. An identifier of the ONU may be carried in the at least one piece of feedback information, or may be separately sent to the OLT.

A third aspect of this application provides a passive optical network (PON) system, including an optical distribution network (ODN) and at least one optical network unit (ONU), where the at least one ONU is respectively connected to at least one port of the ODN, and each of the at least one ONU is connected to a different port of the ODN: the ODN includes at least one optical splitter: and reflection points are disposed at a plurality of branch ends of each of the at least one optical splitter, the reflection point is configured to reflect an optical signal of a first preset wavelength, and the plurality of branch ends are all or some of branch ends of each optical splitter.

Optionally, in a possible implementation, the PON system further includes an optical line terminal (OLT);

an output end of the OLT is connected to a backbone end of the ODN;

a first ONU is further configured to send at least one piece of feedback information to the OLT, where the at least one piece of feedback information is generated by the first ONU based on optical power values of received optical signals corresponding to all of N wavelengths, the first ONU is any one of the at least one ONU, the N wavelengths are different from each other, and N is a positive integer: and the OLT is further configured to determine, based on the at least one piece of feedback information, information about an optical splitter port corresponding to the first ONU.

In this implementation of this application, the ONU may receive the optical signals corresponding to all of the N wavelengths, generate the at least one piece of feedback information based on the optical power values of the optical signals corresponding to all of the N wavelengths, and send the at least one piece of feedback information to the OLT, where optical signals corresponding to the N wavelengths may be all or some of optical signals received by the ONU, so that the OLT can accurately determine, based on the at least one piece of feedback information, the information about the optical splitter port corresponding to the ONU. Compared with manually recording a port number, in this application, port information accuracy can be improved, and port information monitoring efficiency can be improved.

Optionally, in a possible implementation, the optical signals that are of all of the N wavelengths and that are received by the first ONU may be sent by the OLT to the first ONU, for example, a laser or a tunable laser is integrated into the OLT: or the optical signals that are of all of the N wavelengths and that are received by the first ONU may be sent by an independently disposed laser to the first ONU. Therefore, in this implementation of this application, the optical signals corresponding to the N wavelengths may be sent to the first ONU in a plurality of manners.

Optionally, in a possible implementation, the at least one piece of feedback information includes the optical power values of the optical signals that are of all of the N wavelengths and that are received by the first ONU: and if N is greater than K, and differences between optical power values of the optical signals corresponding to the N wavelengths include a difference greater than a threshold, the OLT is further configured to determine K smallest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and K is a positive integer:

the OLT is further configured to determine optical signal wavelengths that are in a one-to-one correspondence with the K optical power values, to obtain K wavelengths: and the OLT is specifically configured to determine, based on the K wavelengths, the information about the optical splitter port corresponding to the first ONU.

In this implementation of this application, the OLT may determine the K smallest optical power values from the optical power values that are of the optical signals corresponding to the N wavelengths and that are fed back by the first ONU, and determine, based on the K optical power values, the information about the optical splitter port corresponding to the first ONU. Therefore, in this application, the information about the optical splitter port corresponding to the first ONU can be accurately determined by using the smallest optical power values.

In a possible implementation, the at least one piece of feedback information may include L largest optical power values or L wavelengths corresponding to the L largest optical power values, so that the OLT can directly determine, based on the L wavelengths corresponding to the L largest optical power values in optical power values of the optical signals corresponding to the N wavelengths and a preset mapping relationship between a wavelength and a port, the optical splitter port corresponding to the first ONU, without performing a comparison step, thereby reducing a workload of the OLT.

Optionally, in a possible implementation, the at least one piece of feedback information includes the information about the optical splitter port corresponding to the first ONU: and if N is greater than K, and differences between optical power values of the optical signals corresponding to the N wavelengths include a difference greater than a threshold, the first ONU is further configured to determine K smallest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and K is a positive integer;

the first ONU is further configured to determine optical signal wavelengths that are in a one-to-one correspondence with the K optical power values, to obtain K wavelengths: and the first ONU is further configured to determine, based on the K wavelengths, the information about the optical splitter port corresponding to the first ONU.

Optionally, in a possible implementation, the first ONU or the OLT is specifically configured to: determine information about at least K reflection points based on the K wavelengths, where the at least K reflection points reflect optical signals corresponding to the K wavelengths, and each of the at least K reflection points reflects an optical signal of one of the K wavelengths: and determine, based on the information about the at least K reflection points, the information about the optical splitter port corresponding to the first ONU.

Optionally, in a possible implementation, if N is greater than K, and none of the differences between the optical power values of the optical signals corresponding to the N wavelengths is greater than the threshold, the OLT determines that the optical splitter port corresponding to the first ONU is included in at least one preset port, and the at least one preset port is a port of at least one optical splitter.

Optionally, in a possible implementation, a first optical signal includes a primary signal and a secondary signal, and an optical power value of the primary signal is greater than an optical power value of the secondary signal, and the first optical signal is an optical signal of one of the K wavelengths: and the K optical power values are determined, by the first ONU or the OLT based on the optical power value of the primary signal, from the optical power values of the optical signals corresponding to the N wavelengths.

Optionally, in a possible implementation, the port information includes information about a first port corresponding to the first optical signal, the information about the first port corresponding to the first optical signal is determined by the OLT or the first ONU based on information about the secondary signal. In this implementation of this application, if the OLT determines the information about the optical splitter port corresponding to the ONU, the ONU may send the information about the secondary signal of the received first optical signal to the OLT, where the information about the secondary signal is, for example, the optical power value of the secondary signal or indication information that indicates that the first optical signal has the secondary signal, so that the OLT can determine, based on the information about the secondary signal and the K optical power values, the information about the port corresponding to the first optical signal, so that the information about the optical splitter port corresponding to the first ONU can be more accurately determined. If the ONU directly determines the information about the optical splitter port corresponding to the ONU and sends the information about the optical splitter port corresponding to the ONU to the OLT, the ONU may determine, based on the information about the secondary signal and the K optical power values, the information about the port corresponding to the first optical signal, so that the information about the optical splitter port corresponding to the first ONU can be more accurately determined. Therefore, in this implementation of this application, after the K smallest optical power values are determined based on the optical power value of the primary signal, the information about the port corresponding to the first optical signal can be further determined based on the information about the secondary signal. Compared with manually recording a port number, in this application, accuracy of determining the optical splitter port corresponding to the first ONU can be significantly improved, and port detection efficiency can be improved. Even if the first ONU replaces a connected port, the OLT can accurately determine, in a timely manner, information about an optical splitter port corresponding to the first ONU.

Optionally, in a possible implementation, the first ONU is further configured to send the OLT identification information of the first ONU, for example, an identification number of the first ONU, a device name of the first ONU, or a sequence number of the first ONU, so that the OLT can identify the first ONU. An identifier of the first ONU may be carried in optical power information, or may be separately sent to the OLT.

Optionally, in a possible implementation, that the optical line terminal (OLT) further sends the optical signals corresponding to all of the N wavelengths to the at least one optical network unit (ONU) may include: The OLT sends indication information, where the indication information is used to indicate a laser to send a second optical signal, the indication information includes information about a wavelength of the second optical signal, and the second optical signal is an optical signal corresponding to any one of the N wavelengths. In this implementation of this application, the OLT may send the indication information to control the laser to send an optical signal of any one of the N wavelengths, and the indication information further carries information about the corresponding wavelength, so that the laser can accurately send an optical signal of each wavelength.

Optionally, in a possible implementation, before the OLT sends the indication information, the method may further include: The OLT sends the information about the wavelength of the second optical signal to the at least one ONU. The second optical signal is an optical signal of any one of the N wavelengths.

In this implementation of this application, the OLT may send information about all of the N wavelengths to the at least one ONU, including the information about the wavelength of the second optical signal, so that the at least one ONU can accurately receive the second optical signal.

A fourth aspect of this application provides a PON system, including an optical distribution network (ODN) and at least one optical network unit (ONU), where the at least one ONU is respectively connected to at least one port of the ODN, and each of the at least one ONU is connected to a different port of the ODN:

the ODN includes at least one optical splitter: and transmittance points are disposed at a plurality of branch ends of each of the at least one optical splitter, and the transmittance point is configured to transmit an optical signal of a second preset wavelength.

Optionally, in a possible implementation, the PON system further includes an optical line terminal (OLT):

an output end of the OLT is connected to a backbone end of the ODN;

a first ONU is further configured to send at least one piece of feedback information to the OLT, where the at least one piece of feedback information is generated by the first ONU based on optical power values of received optical signals corresponding to all of N wavelengths, and the first ONU is any one of the at least one ONU; and the OLT is further configured to determine, based on the at least one piece of feedback information, information about an optical splitter port corresponding to the first ONU.

Optionally, in a possible implementation, optical signals that are of all of the N wavelengths and that are received by the first ONU may be sent by the OLT to the first ONU, for example, a laser or a tunable laser is integrated into the OLT: or optical signals that are of all of the N wavelengths and that are received by the first ONU may be sent by an independently disposed laser to the first ONU. Therefore, in this implementation of this application, the optical signals corresponding to the N wavelengths may be sent to the first ONU in a plurality of manners.

Optionally, in a possible implementation, if differences between optical power values of the optical signals corresponding to the N wavelengths include a difference greater than a threshold, the OLT is further configured to determine L largest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and L is a positive integer not greater than N:

the OLT is further configured to determine optical signal wavelengths that are in a one-to-one correspondence with the L optical power values, to obtain L wavelengths: and the OLT is specifically configured to determine, based on the L wavelengths, the information about the optical splitter port corresponding to the first ONU.

In this implementation of this application, the OLT may determine, based on the L largest optical power values, the optical splitter port corresponding to the first ONU. Compared with manually recording a port number, in this application, port information accuracy can be improved, and port information monitoring efficiency can be improved. In a possible implementation, the at least one piece of feedback information may include L largest optical power values or L wavelengths corresponding to the L largest optical power values, so that the OLT can directly determine, based on the L wavelengths corresponding to the L largest optical power values in optical power values of the optical signals corresponding to the N wavelengths and a preset mapping relationship between a wavelength and a port, the optical splitter port corresponding to the first ONU, without performing a comparison step, thereby reducing a workload of the OLT.

Optionally, in a possible implementation, the at least one piece of feedback information includes the information about the optical splitter port corresponding to the first ONU; and if N is greater than L, and differences between optical power values of the optical signals corresponding to the N wavelengths include a difference greater than a threshold, the first ONU is further configured to determine L largest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and L is a positive integer;

the first ONU is further configured to determine optical signal wavelengths that are in a one-to-one correspondence with the L optical power values, to obtain L wavelengths: and the first ONU is further configured to determine, based on the L wavelengths, the information about the optical splitter port corresponding to the first ONU.

In this implementation of this application, optical signals corresponding to the L wavelengths are transmitted by the transmittance point, and an optical signal of another wavelength is reflected by the transmittance point and therefore has a smaller power value than the optical signals corresponding to the L wavelengths. Therefore, specific wavelengths whose optical signals are transmitted by the optical splitter port corresponding to the first ONU may be determined based on the L wavelengths, to determine, based on preset identification information of a wavelength of an optical signal transmitted by a transmittance point and a port number, specific ports corresponding to the L wavelengths, to determine the information about the optical splitter port corresponding to the first ONU.

Optionally, in a possible implementation, if N is greater than K, and none of the differences between the optical power values of the optical signals corresponding to the N wavelengths is greater than the threshold, the first ONU or the OLT is further configured to determine that the optical splitter port corresponding to the first ONU is included in at least one preset port, and the at least one preset port is a port of at least one optical splitter.

Optionally, in a possible implementation, the first ONU is further configured to send the OLT identification information of the first ONU, for example, an identification number of the first ONU, a device name of the first ONU, or a sequence number of the first ONU, so that the OLT can identify the first ONU. An identifier of the first ONU may be carried in optical power information, or may be separately sent to the OLT.

Optionally, in a possible implementation, that the optical line terminal (OLT) further sends the optical signals corresponding to all of the N wavelengths to the at least one optical network unit (ONU) may include: The OLT sends indication information, where the indication information is used to indicate a laser to send a second optical signal, the indication information includes information about a wavelength of the second optical signal, and the second optical signal is an optical signal corresponding to any one of the N wavelengths. In this implementation of this application, the OLT may send the indication information to control the laser to send an optical signal of any one of the N wavelengths, and the indication information further carries information about the corresponding wavelength, so that the laser can accurately send an optical signal of each wavelength.

Optionally, in a possible implementation, before the OLT sends the indication information, the method may further include: The OLT sends the information about the wavelength of the second optical signal to the at least one ONU. The second optical signal is an optical signal of any one of the N wavelengths.

In this implementation of this application, the OLT may send information about all of the N wavelengths to the at least one ONU, including the information about the wavelength of the second optical signal, so that the at least one ONU can accurately receive the second optical signal.

A fifth aspect of this application provides an OLT. The OLT has a function of implementing the port detection method in the first aspect. The function may be implemented by hardware, or may be implemented by hardware executing corresponding software. The hardware or the software includes one or more modules corresponding to the foregoing function.

A sixth aspect of this application provides an ONU. The ONU has a function of implementing the port detection method in the second aspect. The function may be implemented by hardware, or may be implemented by hardware executing corresponding software. The hardware or the software includes one or more modules corresponding to the foregoing function.

A seventh aspect of the embodiments of this application provides an OLT. The OLT may include:
  a processor, a memory, and an input/output interface, where the processor and the memory are connected to the input/output interface, the memory is configured to store program code, and when invoking the program code in the memory, the processor performs the steps of the method in any one of the first aspect or the implementations of the first aspect of this application.

An eighth aspect of the embodiments of this application provides an ONU. The ONU may include:
  a processor, a memory, and an input/output interface, where the processor and the memory are connected to the input/output interface, the memory is configured to store program code, and when invoking the program code in the memory, the processor performs the steps of the method in any one of the second aspect or the implementations of the second aspect of this application.

A ninth aspect of the embodiments of this application provides a storage medium. It should be noted that technical solutions of this application essentially, or the part contributing to the prior art, or all or some of the technical solutions may be implemented in a form of a software product. The storage medium is configured to store computer software instructions used by the foregoing device. The computer software instructions include a program that is designed for an OLT or an ONU to perform any one of the implementations of the first aspect and the second aspect.

The storage medium includes various media that may store program code, such as a USB flash drive, a removable hard disk, a read-only memory (ROM), a random access memory (RAM), a magnetic disk, or an optical disc.

A tenth aspect of the embodiments of this application provides a computer program product including instructions. When the computer program product runs on a computer, the computer is enabled to perform the method in any one of the implementations of the first aspect and the second aspect.

An eleventh aspect of the embodiments of this application provides an optical network device. The optical network device may be applied to a device such as an OLT or an ONU. The optical network device is coupled to a memory, and is configured to read and execute instructions stored in the memory, so that the optical network device implements the steps of the method provided in any implementation of any one of the first aspect to the third aspect of this application. In a possible design, the optical network device is a chip or a system on chip.

A twelfth aspect of this application provides a chip system. The chip system includes a processor, configured to support an OLT, an ONU, or the like in implementing the function in any one of the implementations of the first aspect to the third aspect of this application, for example, processing data and/or information in the foregoing method. In a possible design, the chip system further includes a memory. The memory is configured to store program instructions and data that are necessary for the OLT or the ONU. The chip system may include a chip, or may include a chip and another discrete component.

The processor mentioned anywhere above may be a general-purpose central processing unit (CPU), a microprocessor, an application-specific integrated circuit (ASIC), or one or more integrated circuits for controlling program execution of the port detection method in the first aspect or the second aspect.

A thirteenth aspect of the embodiments of this application provides a PON system. The PON system includes an OLT or an ONU:
  the OLT may include the OLT provided in the fifth aspect: and
  the ONU may include the ONU provided in the sixth aspect.

In the implementations of this application, after receiving the N optical signals corresponding to all the wavelengths, each ONU may determine the optical power values of the optical signals corresponding to all of the N wavelengths, and feed back the optical power values of the optical signals corresponding to all of the N wavelengths to the OLT. The OLT may determine, based on the optical power values that are of the optical signals corresponding to all of the N wavelengths and that are fed back by each ONU, the information about the optical splitter port corresponding to each ONU. Therefore, the OLT can accurately determine, based on the optical power values that are of the optical signals corresponding to all of the N wavelengths and that are fed back by the ONU, the information about the optical splitter port corresponding to each ONU, thereby improving efficiency and accuracy of determining the information about the optical splitter port corresponding to each ONU.

DESCRIPTION OF EMBODIMENTS

This application provides a port detection method, an optical network device, and a passive optical network system, to quickly and accurately detect a port connected to an ONU, and improve efficiency of determining the port connected to the ONU.

Figure 1A:
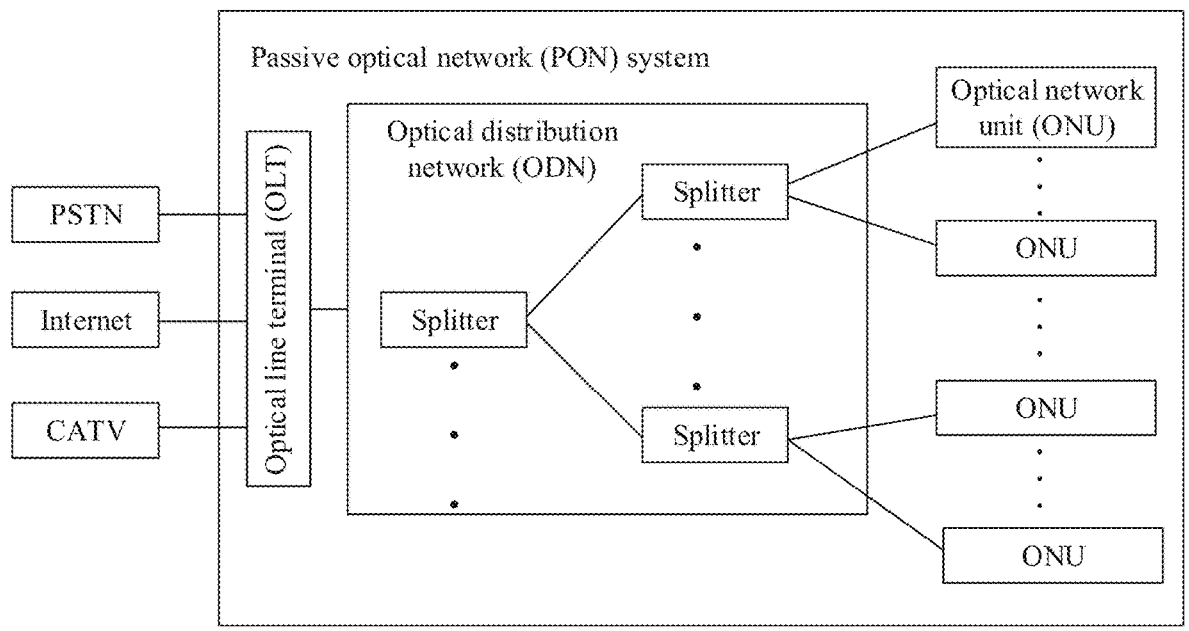
FIG. 1A is a schematic structural diagram of a PON system according to this application.

An architecture of a PON system to which the port detection method provided in this application is applied may be shown in FIG. 1A.

The PON system may include an OLT, an ODN, and at least one ONU.

The ODN may include at least one optical splitter, and may further include an optical fiber. Specifically, the optical fiber may further include a feeder fiber, a distribution fiber, and a drop fiber. The feeder fiber is an optical fiber connected between the OLT and the ODN, and the distribution fiber and the drop fiber may also be referred to as branch fibers. The drop fiber is an optical fiber connected between an optical splitter and a connected ONU, and the distribution fiber is an optical fiber connected between optical splitters in the ODN. In addition, when the ODN includes only one optical splitter, no distribution fiber exists.

The ONU is configured to receive data sent by the OLT, buffer Ethernet data of a user in response to a management command of the OLT, and send the data in an uplink direction in a sending window allocated by the OLT. The ONU may specifically include a bi-direction optical subassembly (BOSA), and the BOSA may further specifically include a transmitter optical subassembly (TOSA), a receiver optical subassembly (ROSA), and the like. The TOSA may be configured to send an optical signal, and the ROSA may be configured to receive an optical signal.

The OLT is a core component of an optical access network, and the OLT is configured to provide data, management, and the like for one or more connected ONUs. The OLT may be configured to send an optical signal to the at least one ONU, receive information fed back by the ONU, and process the information or other data that is fed back by the ONU.

In the PON system, an uplink optical signal and a downlink optical signal may be transmitted in a same optical fiber in a time division multiplexing (TDM) manner. The OLT may broadcast data in a form of an optical signal by using a laser, to transmit the data to the ONU that is connected to the ODN. For example, if a wavelength of an optical signal sent in a downlink direction is 2.1, the OLT broadcasts an optical signal of the wavelength $\lambda_1$; and if a wavelength of an uplink transmitted optical signal is 2.2, the optical signal of the wavelength $\lambda_1$ and the optical signal of the wavelength $\lambda_2$ may be separately transmitted in a same optical fiber by using different slots. Usually, in a GPON system, a wavelength of 1310 nm is used for uplink, and a wavelength of 1490 nm is used for downlink. In a 10G PON system, a wavelength of 1270 nm is used for uplink, and a wavelength of 1577 nm is used for downlink.

In addition, the PON system may further establish a connection to a network or a device such as a public telephone switching network (PTSN), the Internet, or a cable television (CATV).

A PON may specifically include a gigabit-capable passive optical network (GPON), an Ethernet passive optical network (EPON), a 10G gigabit-capable passive optical network (XGPON), a 10G Ethernet passive optical network (10G EPON), or the like.

It should be understood that the at least one ONU in FIG. 1A of this application may include an optical network terminal (ONT), a multiplexer unit (MXU), or the like. Alternatively, the at least one ONU may be replaced with at least one optical network terminal (ONT), or at least one device that is connected to the ODN may include both an ONU and an ONT. In the following description of this application, a step performed by the ONU may be alternatively performed by the ONT. Details are not described below:

It should be further understood that, in the PON system provided in this application, the ODN may include M levels of optical splitters, M is a positive integer, and each level of optical splitter in the M levels of optical splitters may include at least one optical splitter. In the ODN shown in FIG. 1A of this application, only a first-level optical splitter and a second-level optical splitter are shown. In an actual application, the ODN may alternatively include more optical splitters, for example, may further include a third-level optical splitter or a fourth-level optical splitter.

Figure 1B:
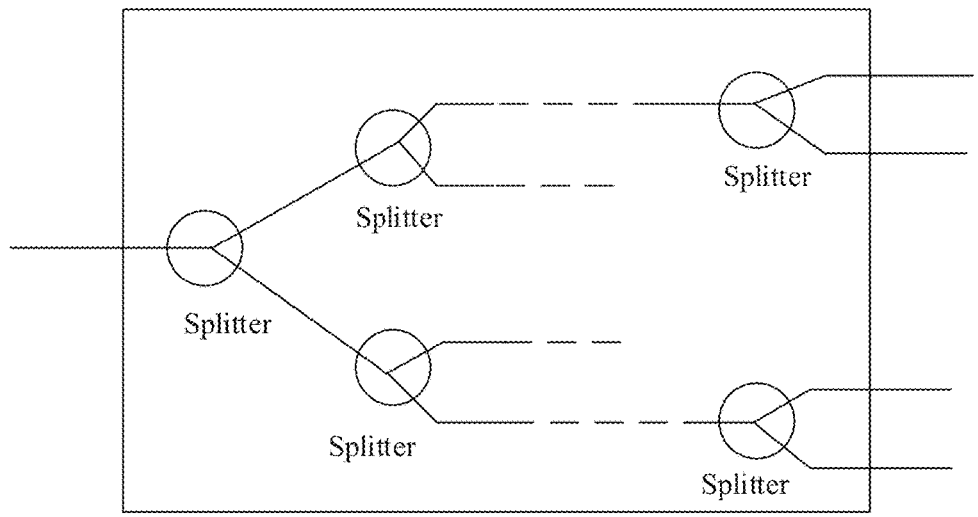
FIG. 1B is a schematic structural diagram of an ODN in a PON system according to this application.

In addition, the optical splitter may be of a 1*n structure, that is, one input end and n output ends, where n is a positive integer: or the optical splitter may be of a 2*n structure or the like. This may be specifically adjusted based on an actual application scenario. This is not limited in this application. For example, if the optical splitter is of a 1*2 structure, a structure of the ODN may be shown in FIG. 1B. The ODN may include a plurality of optical splitters, and a structure of each optical splitter is 1*2. In addition, the optical splitter in FIG. 1B may be alternatively replaced with a 2*2 optical splitter, a 2*n optical splitter, a 1*n optical splitter, or the like. This is specifically adjusted based on an actual application scenario.

It should be understood that the optical splitter in this embodiment of this application may include a backbone end and at least one branch end. For ease of understanding, in the foregoing or the following implementations, the backbone end is referred to as an input end, and the branch end is referred to as a branch end. The ODN includes an optical splitter. Likewise, two ends of the ODN may also be referred to as a backbone end and a branch end.

In the PON system, a carrier or a CO cannot learn an ODN port to which each ONU is connected, and the ODN port connected to the ONU needs to be manually recorded. However, an error may easily occur in a manual recording process. In addition, if the ONU switches a connected port, but a manual record is not updated in a timely manner, the carrier or the CO may have an incorrect record of the port connected to the ONU, causing difficult operation and maintenance. Therefore, this application provides a port detection method. Without manual recording, an OLT can quickly and accurately determine an ODN port connected to an ONU, to reduce an error rate of manually recording the port connected to the ONU, and reduce dependence on a manual operation. In addition, when the ONU switches a port, the OLT can perform updating in a timely manner and determine information about a port to which the ONU switches.

In a PON system to which the port detection method provided in this application is applied, a reflection point may be disposed at each output end of each of at least one optical splitter in an ODN, and the reflection point is configured to partially reflect an optical signal of a preset wavelength, to reduce optical power of the optical signal of the preset wavelength, so that an OLT or an ONU can determine, based on reduced optical power, a reflection wavelength of a reflection point corresponding to a port connected to the ONU, and then determine, based on a binding standard relationship between a reflection wavelength of a reflection point and an optical splitter port, the port connected to the ONU. It may be understood that the ODN includes a plurality of optical transmission channels. Each optical transmission channel includes a channel for transmitting an optical signal from the OLT to the ONU, or a channel for transmitting an optical signal from the ONU to the OLT. Each optical transmission channel includes at least one reflection point. Each reflection point is disposed at an output end of an optical splitter, and is configured to partially reflect an optical signal of a preset wavelength, to reduce optical power of the optical signal of the preset wavelength. The port detection method provided in this application is used to determine information about a corresponding optical splitter port in an optical transmission channel connected to each ONU, including information about an optical splitter port directly connected to each ONU, or further including information about an optical splitter port indirectly connected to the ONU in the optical transmission channel connected to each ONU.

Reflection points may be disposed at all or some of ports of the optical splitter. It may be understood that reflection points are disposed at a plurality of output ends of each of the at least one optical splitter in the ODN, and the reflection point is configured to partially reflect an optical signal of a first preset wavelength, to reduce an optical power value of the optical signal whose wavelength is the first preset wavelength. The reflection point may be alternatively implemented by using an optical grating or a coating film, that is, an optical grating or a coating film may be disposed at a branch end of the optical splitter, so that the optical signal of the first preset wavelength can be completely or partially reflected at the branch end of the optical splitter.

In addition, the reflection point disposed at the output end of the optical splitter may be alternatively replaced with a transmittance point, to transmit an optical signal of a second preset wavelength, and reflect an optical signal that is not of the second preset wavelength, to reduce an optical power value of the optical signal that is not of the second preset wavelength, so that an optical power value of the optical signal that is of the second preset wavelength and that is received by the ONU is larger than the optical power value of the optical signal that is not of the second preset wavelength. Specifically, the transmittance point may be implemented by disposing a transmittance optical grating on the branch end of the optical splitter or by coating the branch end of the optical splitter with a film. The optical grating or the coating film may transmit the optical signal of the second preset wavelength, and partially reflect the optical signal that is not of the second preset wavelength, to reduce the optical power value of the optical signal that is not of the second preset wavelength.

Figure 2:
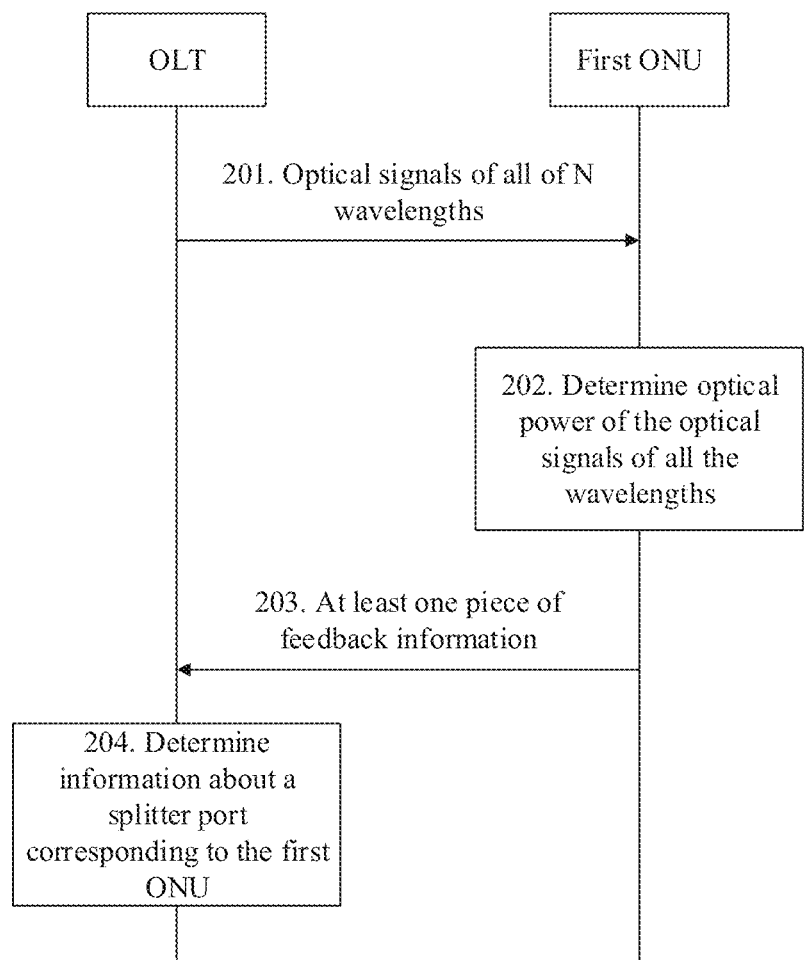
FIG. 2 is a schematic flowchart of a port detection method according to this application.

The following describes in detail the port detection method provided in this application. FIG. 2 is a schematic flowchart of a port detection method provided in this application. The method is described below.

201. An OLT sends optical signals corresponding to all of N wavelengths to a first ONU.

The OLT may sequentially send the optical signals corresponding to all of the N wavelengths to the first ONU. The N wavelengths are different from each other, and N is a positive integer.

It should be understood that the first ONU is any one of one or more ONUs that are connected to a PON system. In this implementation of this application, only the first ONU is used as an example to provide an example description of the port detection method provided in this application.

Usually, the N wavelengths for port detection are different from a band for data transmission between the OLT and the ONU. Optical signals corresponding to the N wavelengths for port detection may be referred to as monitoring light below, and an optical signal for data transmission between the OLT and the ONU may be referred to as service light below. The monitoring light and the service light may be transmitted by using different lasers. In the following, a laser that transmits the monitoring light is referred to as a monitoring laser, and a laser that transmits the service light is referred to as a service laser.

In a specific implementation, the OLT may sequentially broadcast the optical signals corresponding to all of the N wavelengths by using the monitoring laser. The monitoring laser may be a tunable laser, and may transmit optical signals corresponding to different wavelengths. The monitoring laser may alternatively include a plurality of lasers that transmit optical signals corresponding to different wavelengths.

Optionally, the monitoring laser may be integrated into the OLT, so that the OLT can directly control the monitoring laser to send an optical signal. The monitoring laser may be alternatively independent of the OLT. The OLT may directly send a control signal to the monitoring laser to control the monitoring laser to transmit an optical signal; or the OLT may send a control signal to a control module or a control device in the PON system, and the control module or the control device controls the monitoring laser to transmit an optical signal. It should be understood that a specific disposition manner of the monitoring laser may be adjusted based on an actual application scenario. This is not limited in this application.

The laser may include a distributed Bragg reflector (DBR), a direct modulated laser (DML), or the like.

Specifically, the OLT may sequentially broadcast the optical signals corresponding to all of the N wavelengths to all the ONUs in the PON system by using the monitoring laser, so that all the ONUs that are connected to the PON system can receive the optical signals corresponding to all of the N wavelengths.

It may be understood that the optical signals that are of all of the N wavelengths and that are received by the ONU may be sent by the OLT, or may be sent by a laser disposed independently of the OLT or a tunable laser. This embodiment of this application provides an example description by using only an example in which the OLT sends the optical signals corresponding to the N wavelengths to the ONU. Alternatively, an independently disposed laser or a tunable laser may send the optical signals corresponding to the N wavelengths to the first ONU. This may be specifically adjusted based on an actual application scenario.

It should be noted that, in addition to sending the optical signals corresponding to all of the N wavelengths to all the ONUs in the PON system in a broadcast manner, the OLT or the laser may alternatively send the optical signals corresponding to all of the N wavelengths to the ONUs in the PON system in a unicast or multicast manner. It may be understood that the OLT or the laser may broadcast the optical signals corresponding to all of the N wavelengths to all the ONUs in the PON system, or may send the optical signals corresponding to all of the N wavelengths to some ONUs in the PON system.

Optionally, before step 201, that is, before the OLT sequentially sends the optical signals corresponding to all of the N wavelengths to the ONU, the OLT sends indication information to the service laser. The indication information is used to indicate the laser to send a second optical signal, the indication information includes information about a wavelength of the second optical signal, and the second optical signal is an optical signal of any one of the N wavelengths. Alternatively, the OLT sends the indication information to the control module or the control device in the PON system, and the control module or the control device controls the laser to send the second optical signal. For example, each time before the OLT sends the optical signal by using a tunable laser, the OLT may send indication information to the tunable laser, where the indication information includes a wavelength code of the second optical signal; and after receiving the indication information, the tunable laser determines the wavelength of the second optical signal by using the wavelength code, and sends the second optical signal.

It may be understood that, if the optical signals that are of all of the N wavelengths and that are received by the first ONU are sent by an independently disposed laser, the laser may be indicated by the OLT to send the optical signals corresponding to the N wavelengths to the first ONU.

Optionally, before step 201, the OLT further sends the information about the wavelength of the second optical signal to at least one ONU in the PON system, to notify the ONU of a specific wavelength of the received second optical signal. Optionally, in step 201, each of the optical signals corresponding to all of the N wavelengths may further carry information about a corresponding wavelength. For example, if the wavelength of the second optical signal is $\lambda_2$, a value of $\lambda_2$ or the wavelength code may be carried in the second optical signal, so that the ONU can more accurately determine the wavelength of the currently received second optical signal.

In a possible implementation, an optical signal of each wavelength further carries information about the corresponding wavelength, for example, a wavelength code or a wavelength value, so that after receiving the optical signal, the ONU can determine the wavelength of the optical signal based on the wavelength information carried in the optical signal.

Optionally, the optical signal of each of the N wavelengths further carries a feature code. The feature code is used to indicate that the optical signal is a monitoring optical signal, to distinguish between a monitoring optical signal and a service optical signal: or the feature code is used to indicate that the optical signal is not noise, so that the ONU can determine optical power values of the optical signal. It may also be understood that the ONU may determine, based on the feature code, that the received optical signal is an optical signal used to detect a port of the ONU, so that the ONU determines the optical power values of the optical signal, and then performs a subsequent corresponding operation.

202. The first ONU determines optical power values of the optical signals corresponding to all of the N wavelengths.

After receiving the optical signals corresponding to all of the N wavelengths, the first ONU determines the optical power values of the optical signals corresponding to all of the N wavelengths.

The optical signals corresponding to the N wavelengths may be all or some of optical signals received by the first ONU.

203. The first ONU sends at least one piece of feedback information to the OLT.

After determining optical power values of the optical signals corresponding to all of the N wavelengths, the first ONU generates the at least one piece of feedback information based on the optical power values of the optical signals corresponding to all of the N wavelengths, and sends the at least one piece of feedback information to the OLT.

In a possible implementation, the at least one piece of feedback information may include information about an optical splitter port corresponding to the first ONU. The port information may be determined by the first ONU based on optical power values of the received optical signals corresponding to the N wavelengths. For example, the port information may be a sequence number of a first-level optical splitter port connected to the first ONU in an ODN and a sequence number of a second-level optical splitter port connected to the first ONU in the ODN. Specifically, for a manner in which the first ONU determines the information about the corresponding optical splitter port, refer to the following related description in steps 605 and 606 in FIG. 6. Details are not described herein.

In a possible implementation, the at least one piece of feedback information includes optical power information, and the optical power information includes the optical power values of the optical signals that are of all of the N wavelengths and that are received by the first ONU. After receiving the optical signal of each of the N wavelengths, the first ONU may feed back an optical power value of the optical signal of each wavelength. For example, after receiving a first optical signal, the first ONU may feed back an optical power value of the first optical signal to the OLT, and after receiving a second optical signal, the first ONU may feed back an optical power value of the second optical signal to the OLT. Alternatively, after receiving the optical signals corresponding to the N wavelengths, the first ONU feeds back the optical power values of all of the N wavelengths to the OLT by using one feedback message. It may be understood that the at least one piece of feedback information may be one piece of optical power information, including the optical power values of the optical signals corresponding to all of the N wavelengths.

It may be understood that the at least one piece of feedback information may be one piece feedback information, including the optical power values of the optical signals corresponding to all of the N wavelengths: or the at least one piece of feedback information may be at least N pieces of feedback information, and each piece of feedback information includes an optical power value of an optical signal of one wavelength, that is, the first ONU sends the optical power values of the optical signals corresponding to all of the N wavelengths to the OLT.

In a possible implementation, the at least one piece of feedback information may alternatively include K smallest optical power values or K wavelengths corresponding to the K smallest optical power values, so that the OLT can directly determine, based on the K wavelengths corresponding to the K smallest optical power values and a preset mapping relationship between a wavelength and a port, the optical splitter port corresponding to the first ONU, thereby reducing a workload of the OLT. For a specific port determining manner, refer to the following related description in step 204. Details are not described herein.

In another possible implementation, the at least one piece of feedback information may alternatively include L largest optical power values or L wavelengths corresponding to the L optical power values, so that the OLT can directly determine, based on the L wavelengths corresponding to the L largest optical power values and a preset mapping relationship between a wavelength and a port, the optical splitter port corresponding to the first ONU, thereby reducing a workload of the OLT. For a specific port determining manner, refer to the following related description in step 204. Details are not described herein.

It may be understood that the OLT may receive the optical power values that are of the optical signals corresponding to the N wavelengths and that are fed back by the first ONU, and N may be K or L. Therefore, a plurality of feasible implementations of this application are provided, and are flexibly applicable to a plurality of scenarios.

In a possible implementation, the first ONU further sends identification information of the first ONU, for example, an identification number, a number, or a device name of the first ONU, to the OLT. For example, the identification information may include an identification number allocated by the OLT to the ONU, or may be an existing identification number of the ONU.

In a possible implementation, the identification information of the first ONU may be separately sent by the first ONU to the OLT, or may be sent to the OLT by being included in the at least one piece of feedback information, so that the OLT can identify, based on the identification information, that the at least one piece of feedback information is fed back by the first ONU. For example, when sending the optical power information to the OLT, the first ONU may add the identification information of the first ONU to the optical power information: or when sending the port information to the OLT, the first ONU may add the identification information of the first ONU to the port information.

204. The OLT determines, based on the at least one piece of feedback information, the information about the optical splitter port corresponding to the first ONU.

After receiving the at least one piece of feedback information fed back by the first ONU, the OLT determines, based on the at least one piece of feedback information, the information about the optical splitter port corresponding to the first ONU.

In a possible implementation, the information about the optical splitter port corresponding to the first ONU may include information about an optical splitter port in an optical transmission channel connected to the first ONU, and may specifically include information about an optical splitter port directly or indirectly connected to the first ONU, for example, a number, an identifier, or a name of the optical splitter port directly or indirectly connected to the first ONU. The optical transmission channel may be understood as a transmission channel for transmitting an optical signal from the OLT or the laser to the first ONU. For example, if the ODN includes two levels of optical splitters, the port information includes information about a first-level optical splitter port in the optical transmission channel and information about a second-level optical splitter port in the optical transmission channel.

A first-level optical splitter is indirectly connected to the first ONU, and a second-level optical splitter is directly connected to the first ONU.

The first ONU may be indirectly connected to the optical splitter port. For example, a plurality of ports of an optical splitter are connected to customer premises equipment (CPE) by using optical fibers, a plurality of ports of the CPE are connected to a plurality of branch ends of the optical splitter one by one, a reflection point may also be disposed on each port of the CPE, and the first ONU may be connected to one of the ports of the CPE. In this case, it may be considered that the first ONU is indirectly connected to the optical splitter connected to the CPE.

In a possible implementation, the at least one piece of feedback information is the optical power information fed back by the first ONU, and the optical power information includes the optical power values of the optical signals that are of all of the N wavelengths and that are received by the first ONU. The OLT may compare the optical power values of the optical signals that are of all of the N wavelengths and that are received by the first ONU, to determine the K smallest optical power values, where K is a positive integer. The OLT determines, based on the K optical power values, optical signal wavelengths that are in a one-to-one correspondence with the K optical power values, to obtain the K wavelengths, and determines, based on the K wavelengths, the information about the optical splitter port corresponding to the first ONU. Therefore, in this implementation of this application, without manual recording, the OLT can compare optical power values of the optical signals received by the ONU, to determine a port connected to each ONU, thereby improving port detection accuracy and efficiency. Further, for a manner in which the OLT determines the information about the optical splitter port corresponding to the first ONU, refer to the following related description in steps 305 and 306 in FIG. 3. Details are not described herein.

In a scenario, before the K smallest optical power values are determined, it has been determined that differences between the optical power values of the optical signals corresponding to the N wavelengths include a difference greater than a threshold. It may also be understood that if the differences between the optical power values of the optical signals corresponding to the N wavelengths include the difference greater than the threshold, the K smallest optical power values are determined from the optical power values of the optical signals corresponding to the N wavelengths, so that the OLT can determine, based on the K optical power values, the optical signal wavelengths that are in a one-to-one correspondence with the K optical power values, to obtain the K wavelengths, and determine, based on the K wavelengths, the information about the optical splitter port corresponding to the first ONU.

It should be noted that in this implementation of this application, a value of K may be adjusted based on a specific application scenario. For example, if two reflection points are disposed in one optical transmission channel, a value of K is 2. For another example, if one reflection point is disposed in one optical transmission channel, a value of K is 1.

In a scenario, if the at least one piece of feedback information sent by the first ONU to the OLT includes the K smallest optical power values or the K wavelengths corresponding to the K smallest optical power values, the OLT may directly determine, based on the K smallest optical power values or the K wavelengths, the optical splitter port corresponding to the first ONU, without performing selection from the optical power values of the optical signals corresponding to all of the N wavelengths, thereby reducing a workload of the OLT.

In another possible implementation, if transmittance points are disposed at a plurality of output ends of an optical splitter, the at least one piece of feedback information is the optical power values that are of the optical signals corresponding to all of the N wavelengths and that are fed back by the first ONU, and N is greater than L, the OLT may compare the optical power values of the optical signals that are of all of the N wavelengths and that are received by the first ONU: and if differences between the optical power values of the optical signals corresponding to the N wavelengths include a difference greater than a threshold, determine the L largest optical power values, where L is a positive integer. The OLT determines, based on the L optical power values, optical signal wavelengths that are in a one-to-one correspondence with the L optical power values, to obtain the L wavelengths, and determines, based on the L wavelengths and the mapping relationship between a wavelength and a port, the information about the optical splitter port corresponding to the first ONU. Therefore, in this implementation of this application, without manual recording, the OLT can compare optical power values of the optical signals received by the ONU, to determine a port connected to each ONU, thereby improving port detection accuracy and efficiency.

For example, if the first ONU receives optical signals corresponding to 10 wavelengths, and a difference between optical power value of an optical signal of one of the wavelengths and optical power value of each of the other nine wavelengths is greater than the threshold, a largest optical power value may be selected. Then, the wavelength of the optical signal corresponding to the largest optical power value, that is, a wavelength of an optical signal transmitted by a transmittance point, is determined, to determine, based on a preset mapping relationship between a wavelength transmitted by a transmittance point and an optical splitter port, the optical splitter port corresponding to the first ONU.

Specifically, the transmittance point may be implemented by disposing a transmittance optical grating on a branch end of the optical splitter or by coating a branch end of the optical splitter with a film. The optical grating or the coating film may transmit an optical signal of a second preset wavelength, and partially reflect an optical signal that is not of the second preset wavelength, to reduce an optical power value of the optical signal that is not of the second preset wavelength.

In a possible implementation, if none of the differences between the optical power values of the optical signals corresponding to the N wavelengths is greater than the threshold, the optical splitter port corresponding to the first ONU is included in at least one preset port of at least one optical splitter. For example, if the optical splitter port connected to the first ONU is a port on which no reflection point or transmittance point is disposed, when the optical power values of the optical signals that are of all of the N wavelengths and that are received by the first ONU approximate to each other or are the same, in other words, the differences between the optical power values of the optical signals corresponding to the N wavelengths are less than the threshold, it can be determined that the port connected to the first ONU is a preset port on which no reflection point or transmittance point is disposed.

In another possible implementation, the at least one piece of feedback information fed back by the first ONU to the OLT may include the L wavelengths corresponding to the L largest optical power values, in other words, the first ONU may directly send the L wavelengths to the OLT, so that the OLT can directly determine, based on the L wavelengths and the preset mapping relationship between a wavelength and a port, the optical splitter port corresponding to the first ONU, without performing selection from the optical power values of the N wavelengths, thereby reducing a workload of the OLT.

In another possible implementation, the at least one piece of feedback information includes the information about the optical splitter port corresponding to the first ONU. The OLT may directly read the port information, to determine, based on the port information, the information about the optical splitter port corresponding to the first ONU. Therefore, in this implementation of this application, the first ONU may determine the connected ODN port based on the optical power values of the received optical signals corresponding to all of the N wavelengths, and notify the OLT of the connected ODN port, so that the OLT can accurately and quickly determine the information about the optical splitter port corresponding to the first ONU. In addition, before the first ONU determines the port information, the OLT may deliver the preset mapping relationship between a wavelength and a port to the first ONU, so that the ONU can determine, based on the selected K wavelengths or L wavelengths and the mapping relationship, the information about the optical splitter port corresponding to the ONU.

Therefore, in this implementation of this application, the OLT or the ONU may determine, based on the optical power values of the optical signals that are of all of the N wavelengths and that are received by the ONU, the information about the port connected to the ONU. Even if the ONU adjusts a connected port, the OLT can detect an adjusted port in a timely manner. Therefore, efficiency of detecting the port connected to the ONU can be improved, so that the OLT can monitor the port connected to the ONU. Compared with manually recording the information about the optical splitter port corresponding to the ONU, in the port detection method provided in this application, the OLT can quickly and accurately detect the information about the optical splitter port corresponding to the ONU, thereby improving port detection efficiency and accuracy.

The foregoing describes the port detection method provided in this application. The following further describes the port detection method provided in this application It should be noted that, the following implementations are described by using only an example in which reflection points are disposed at a plurality of output ends of an optical splitter. In an actual application, the following reflection point may be replaced with a transmittance point, and a manner of determining, based on a wavelength of an optical signal transmitted by a transmittance point, an optical splitter port corresponding to an ONU is similar to a manner of determining, based on a wavelength of an optical signal reflected by a reflection point, an optical splitter port corresponding to an ONU. Details are not described below.

In the port detection method provided in this application, an OLT may perform port detection, or an ONU may perform port detection. The following separately describes different scenarios.

1. An OLT Performs Port Detection.

Figure 3:
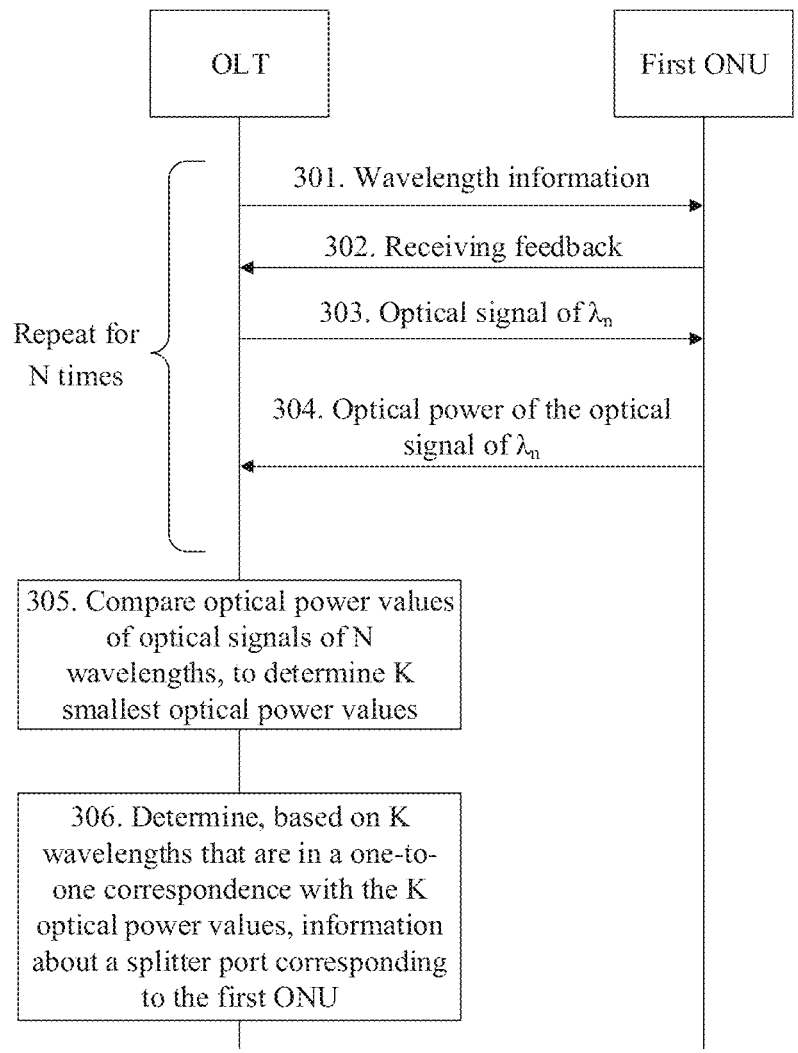
FIG. 3 is a schematic flowchart of another port detection method according to this application.

FIG. 3 is a schematic flowchart of another port detection method according to this application. The method is described below.

301. An OLT sends wavelength information to a first ONU.

Before sending an optical signal of a wavelength $\lambda_n$ to the first ONU by using a monitoring laser, the OLT may send wavelength information corresponding to the wavelength $\lambda_n$ to the first ONU. The wavelength information includes information about the wavelength of the to-be-sent optical signal, for example, a wavelength code of the optical signal, or a value of the wavelength. The first ONU is any one of at least one ONU that is connected to an ODN. Before the OLT sends a second optical signal to the at least one ONU in a PON system, the OLT sends information about a wavelength of the second optical signal to the at least one ONU, to notify the ONU of the wavelength of the second optical signal, so that the ONU can successfully receive the second optical signal.

For example, before sending an optical signal of a wavelength $\lambda_1$, the OLT may broadcast a wavelength code corresponding to $\lambda_1$ or a value of $\lambda_1$ to the at least one ONU. For example, the wavelength code corresponding to $\lambda_1$ is 000, and a wavelength code corresponding to $\lambda_2$ is 001.

302. The first ONU sends a receiving feedback message to the OLT.

After receiving the wavelength information sent by the OLT, the first ONU generates the receiving feedback message, and sends the receiving feedback message to the OLT, to notify the OLT that the first ONU receives the wavelength information.

303. The OLT sends the optical signal of the wavelength $\lambda_n$ to the first ONU.

After determining that the first ONU has received the wavelength information corresponding to the wavelength $\lambda_n$, the OLT sends the optical signal of the wavelength $\lambda_n$ by using the monitoring laser, and the first ONU receives the optical signal of the wavelength $\lambda_n$. $\lambda_n$ is one of N wavelengths whose optical signals need to be sent by the OLT to the ONU. It may be understood that n may be a positive integer variable greater than or equal to N.

The OLT may determine, by using the receiving feedback information fed back by the first ONU, that the first ONU receives the wavelength information. Usually, in an actual application, wavelengths of optical signals that are of all of the N wavelengths and that are sent by the OLT to the ONU may cover reflection wavelengths of reflection points disposed in optical splitters in the ODN. For example, if the reflection wavelengths of the reflection points disposed in the ODN are $\lambda_1$ to $\lambda_n$, the N wavelengths include at least $\lambda_1$ to $\lambda_n$. Usually, the reflection point disposed in the ODN reflects monitoring light, and transmits service light, that is, does not reflect the service light, to reduce impact on data transmission.

It should be understood that step 303 may be alternatively replaced with an independently disposed laser sends the optical signal of the wavelength $\lambda_n$ to the first ONU.

304. The first ONU sends optical power value of the optical signal of in to the OLT.

After receiving the optical signal of the wavelength $\lambda_n$, the first ONU detects the optical power value of the optical signal of the wavelength $\lambda_n$, and sends feedback information to the OLT, where the feedback information includes an optical power value of the optical signal of the wavelength $\lambda_n$, and the feedback information carries an identifier of the first ONU, so that the OLT can obtain the optical power value of the optical signal that is of the wavelength $\lambda_n$ and that is received by the first ONU.

It should be understood that if the OLT sends the optical signals corresponding to all of the N wavelengths to the at least one ONU in the PON system, steps 301 and 304 may be repeated for N times, to complete sending of the optical signals corresponding to all of the N wavelengths.

In addition, it should be noted that the first ONU may send optical power information to the OLT. The optical power information may be at least one piece of feedback information. A specific optical power information sending manner may include: each time after receiving an optical signal, the first ONU sends an optical power value of the optical signal to the OLT: or after receiving the optical signals corresponding to the N wavelengths, the first ONU sends one piece of feedback information to the OLT, where the feedback information may include optical power values of the optical signals corresponding to all of the N wavelengths, that is, step 304 may not need to be repeated for N times.

305. The OLT compares the optical power values of the optical signals corresponding to all of the N wavelengths, to determine K smallest optical power values.

After receiving optical power values that are of the optical signals corresponding to the N wavelengths and that are fed back by the first ONU, the OLT compares the optical power values of the optical signals corresponding to the N wavelengths, to determine the K smallest optical power values. The optical power values of the optical signals corresponding to the N wavelengths include the optical power values of the optical signals corresponding to all of the N wavelengths.

It should be understood that the K smallest optical power values may be determined from the optical power values of the optical signals corresponding to all of the N wavelengths only in a scenario in which differences between the optical power values of the optical signals corresponding to the N wavelengths include a difference greater than a threshold.

Specifically, the OLT may sort the optical power values of the optical signals corresponding to the N wavelengths in ascending order or descending order, and then determine the K smallest optical power values from the sorted optical power values. Alternatively, the OLT may compare the optical power values of the optical signals corresponding to all of the N wavelengths with each other to determine the K smallest optical power values.

In this application, a reflection point is disposed at an output end of each optical splitter in the ODN, to partially reflect an optical signal of a first preset wavelength, to reduce optical power of the optical signal of the first preset wavelength. Therefore, the OLT can determine the K smallest optical power values from the optical power values of the optical signals that correspond to the N wavelengths and that are received by the first ONU.

Figure 4:
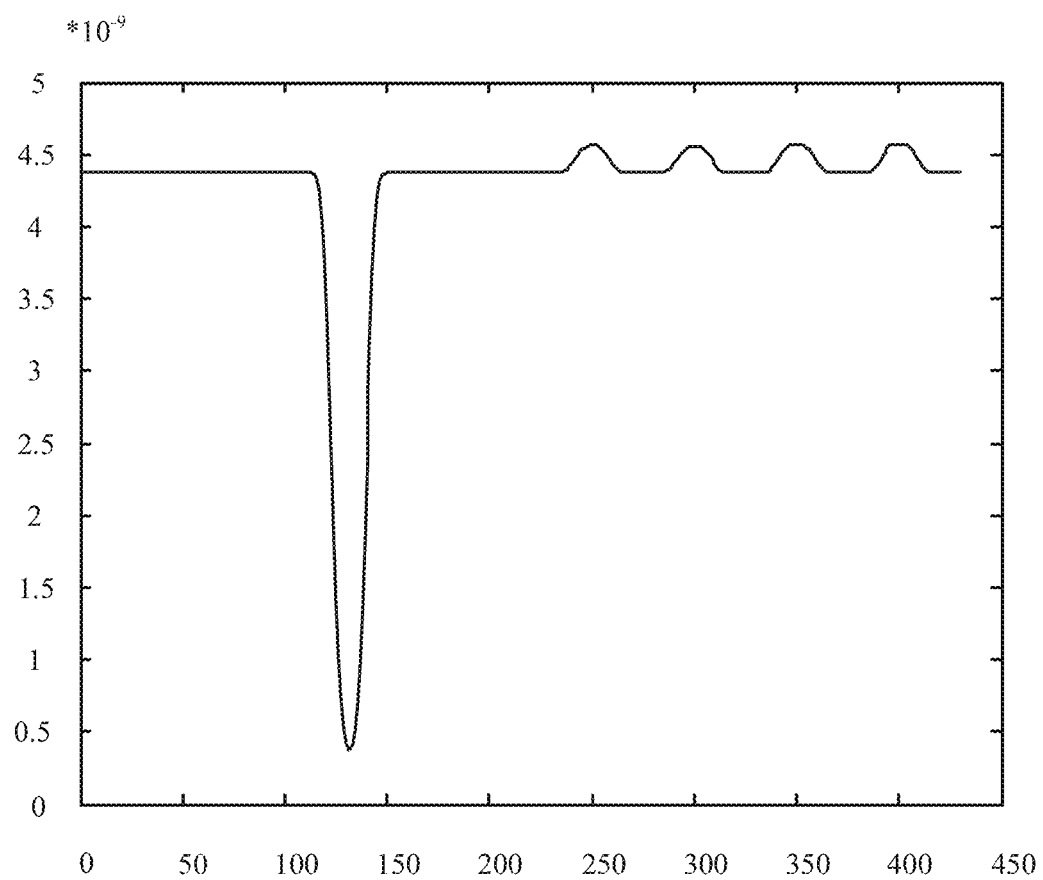
FIG. 4 is a schematic diagram of an optical power value in a port detection method according to this application.

For example, in an optical transmission channel connected to the first ONU, optical power value of an optical signal of a wavelength $\lambda_1$ decreases by 30% after the optical signal is reflected by a first-level optical splitter, and then the optical signal is transmitted to the first ONU: optical power value of an optical signal of a wavelength $\lambda_2$ decreases by 30% after the optical signal is reflected by a second-level optical splitter, and then the optical signal is transmitted to the first ONU: and optical power value of an optical signal that is of another wavelength and that is received by the first ONU is not reflected by a reflection point, so that an optical power value of the optical signal is greater than optical power values of the optical signal of $\lambda_1$ and the optical signal of $\lambda_2$. The OLT may determine that the optical power value of the optical signal of the wavelength $\lambda_1$ and the optical power value of the optical signal of the wavelength $\lambda_2$ are smallest optical power values in the optical power values of the optical signals corresponding to the N wavelengths, and determine that $\lambda_1$ and $\lambda_2$ are reflection wavelengths of reflection points disposed in the optical transmission channel connected to the first ONU. As shown in FIG. 4, after obtaining optical power value of the optical signals that are of all of the N wavelengths and that are received by the first ONU, the OLT compares optical power values of different bands, to identify a wavelength of relatively small optical power, that is, optical signal wavelengths that are in a one-to-one correspondence with the K smallest optical power values.

It should be understood that the optical transmission channel in this application includes a transmission channel for transmitting an optical signal from the OLT or the laser to the first ONU, or a transmission channel for transmitting an optical signal from the first ONU to the OLT.

306. The OLT determines, based on K wavelengths that are in a one-to-one correspondence with the K optical power values, information about an optical splitter port corresponding to the first ONU.

After determining the K smallest optical power values from the optical power values of the optical signals corresponding to the N wavelengths, the OLT determines the optical signal wavelengths that are in a one-to-one correspondence with the K optical power values, to obtain the K wavelengths, and determines, based on the K wavelengths, the information about the optical splitter port corresponding to the first ONU.

In a possible scenario, the first ONU sends the K smallest optical power values or the K wavelengths corresponding to the K smallest optical power values to the OLT, so that the OLT can directly determine, based on the K wavelengths corresponding to the K smallest optical power values and a preset mapping relationship between a wavelength and a port, the information about the optical splitter port corresponding to the first ONU, without performing selection from the optical power values of the optical signals corresponding to the N wavelengths, thereby reducing a workload of the OLT.

For the port information, refer to the foregoing related description in step 204.

Specifically, after determining the K optical power values, the OLT may determine, based on a mapping relationship between an optical power value and a corresponding wavelength, the optical signal wavelengths that are in a one-to-one correspondence with the K optical power values. The mapping relationship between an optical power value and a corresponding wavelength may be determined when the first ONU feeds back the optical power information. For example, after receiving an optical signal of each wavelength, the first ONU feeds back the optical power value of the optical signal of each wavelength, and after receiving the optical power value of the optical signal of each wavelength, the OLT may store the optical power value and the corresponding wavelength. Alternatively, if the first ONU feeds back the optical power values of the optical signals corresponding to the N wavelengths by using one feedback message, an identifier corresponding to each wavelength may be added to an optical power value of each wavelength. For example, if a wavelength code of $\lambda_1$ is 001, an optical power value of an optical signal of $\lambda_1$ may be represented as [001: 15 dB]. When receiving the optical power information, the OLT may determine, based on an identifier or a code of a wavelength, an optical power value of an optical signal corresponding to the wavelength.

In a specific implementation, the OLT may determine, based on the K wavelengths and a preset first mapping relationship, the information about the optical splitter port corresponding to the first ONU. The first mapping relationship may include a correspondence between a wavelength and a port number. After the K wavelengths are determined, port numbers corresponding to the K wavelengths may be determined based on the preset relationship, to obtain the information about the optical splitter port corresponding to the first ONU.

It should be noted that in a scenario in which a reflection point is disposed at a branch end of the optical splitter, the first mapping relationship may be a mapping relationship between a wavelength of an optical signal reflected by a reflection point and a port number. In a scenario in which a transmittance point is disposed at a branch end of the optical splitter, the first mapping relationship may be a mapping relationship between a wavelength of an optical signal transmitted by a transmittance point and a port number. Herein, only the scenario in which the reflection point is disposed at the branch end of the optical splitter is used as an example for description. This may be specifically adjusted based on an actual application scenario.

The first mapping relationship may be generated by the OLT. If the ONU detects the optical splitter port corresponding to the ONU, the OLT may send the first mapping relationship to the ONU, so that the ONU can determine, based on the K wavelengths and the first mapping relationship, the optical splitter port corresponding to the ONU.

For example, a relationship between a reflection wavelength of each reflection point and a port number may be recorded in advance, and a wavelength of an optical signal reflected by a reflection point disposed in a first-level optical splitter is different from a wavelength of an optical signal reflected by a reflection point disposed in a second-level optical splitter. As shown in Table 1, after the K wavelengths are determined, a port number of a port in the optical transmission channel connected to the first ONU may be determined based on the first mapping relationship shown in Table 1. For example, if the K wavelengths include $\lambda_1$ and $\lambda_5$, it may be determined that the information about the optical splitter port corresponding to the first ONU includes a first-level optical splitter port number 001 and a second-level optical splitter port number 005.

TABLE 1

| First-level optical splitter reflection wavelength | Second-level optical splitter reflection wavelength | First-level optical splitter port number | Second-level optical splitter port number |
|---|---|---|---|
| $\lambda_1$ | $\lambda_4$ | 001 | 004 |
| $\lambda_2$ | $\lambda_5$ | 002 | 005 |
| $\lambda_3$ | $\lambda_6$ | 003 | 006 |

In a possible implementation, at least one optical splitter is disposed in the ODN, a reflection point is disposed at each output end of each of the at least one optical splitter, and the reflection point is configured to reflect an optical signal of a preset wavelength, to reduce an optical power value of the optical signal that is of the preset wavelength and that is received by the first ONU. Optical signals corresponding to the K wavelengths are transmitted to the first ONU by using the ODN, and are reflected by reflection points disposed in the optical transmission channel connected to the first ONU, thereby reducing optical power values. Therefore, the optical power values of the optical signals that are of the K wavelengths and that are received by the first ONU each are less than an optical power value of an optical signal of a wavelength other than the K wavelengths in the N wavelengths.

Specifically, in some scenarios, reflection points do not need to be disposed at all branch ends of each optical splitter in the ODN, and reflection points may be disposed at a plurality of branch ends of each optical splitter in the ODN. The plurality of branch ends are all or some of branch ends of each optical splitter. The reflection point is configured to reflect the optical signal of the first preset wavelength, to reduce an optical power value of the optical signal of the first preset wavelength.

In another specific implementation, the OLT may determine information about at least K reflection points based on the K wavelengths, and determine, based on the information about the at least K reflection points, the information about the optical splitter port corresponding to the first ONU. The K reflection points are optical splitter reflection points corresponding to the first ONU. For example, if the optical transmission channel connected to the first ONU includes an optical splitter 1 and an optical splitter 2, and the optical splitter 1 is connected to the first ONU by using the optical splitter 2. It may be understood that the first ONU is directly connected to the optical splitter 2, and is indirectly connected to the optical splitter 1. The K reflection points may include a reflection point disposed in a port that is in the optical splitter 1 and that is indirectly connected to the first ONU and a reflection point disposed in a port that is in the optical splitter 2 and that is directly connected to the first ONU.

Specifically, that the OLT determines information about at least K reflection points based on the K wavelengths may specifically include: The OLT determines, after determining the K wavelengths, the information about the at least K reflection points based on the K wavelengths and a second mapping relationship. The second mapping relationship may include a correspondence between a wavelength and a reflection point. After determining the K wavelengths, the OLT may determine the information about the at least K reflection points based on the K wavelengths and the second mapping relationship. One wavelength may correspond to one or more reflection points. Therefore, a quantity of determined reflection points may be greater than K. For example, if both a first-level optical splitter reflection wavelength and a second-level optical splitter reflection wavelength are $\lambda_1$, the K wavelengths include only the wavelength $\lambda_1$, information about two reflection points may be determined, and both the two reflection points reflect an optical signal of the wavelength $\lambda_1$. For example, the second mapping relationship is shown in Table 2.

TABLE 2

| First-level optical splitter reflection wavelength | Second-level optical splitter reflection wavelength | First-level optical splitter reflection point | Second-level optical splitter reflection point |
|---|---|---|---|
| $\lambda_1$ | $\lambda_4$ | 0011 | 0024 |
| $\lambda_2$ | $\lambda_5$ | 0012 | 0025 |
| $\lambda_3$ | $\lambda_6$ | 0013 | 0026 |

Reflection point information may include reflection point identification numbers that are of a first-level reflection point and a second-level reflection point and that are shown in Table 2, and the reflection point information may further include other reflection point information, such as reflection point numbers or names. For example, if it is determined that the K wavelengths include $\lambda_2$ and $\lambda_6$, it may be determined that an identifier of a corresponding first-level optical splitter reflection point is 0012, and an identifier of a corresponding second-level optical splitter reflection point is 0026.

Further, that the OLT determines, based on the information about the at least K reflection points, the information about the optical splitter port corresponding to the first ONU may specifically include: The OLT determines, based on the information about the at least K reflection points and a third mapping relationship, the information about the optical splitter port corresponding to the first ONU. The at least K reflection points reflect the optical signals corresponding to the K wavelengths, and one of the at least K reflection points reflects an optical signal of one of the K wavelengths. The third mapping relationship may include a mapping relationship between a reflection point and a port number. After the information about the at least K reflection points is determined, port numbers or port identifiers corresponding to the at least K reflection points may be determined based on the third mapping relationship, to obtain the information about the optical splitter port corresponding to the first ONU. For example, the third mapping relationship may be shown in Table 3.

TABLE 3

| First-level optical splitter reflection point | Second-level optical splitter reflection point | First-level optical splitter port number | Second-level optical splitter port number |
|---|---|---|---|
| 0011 | 0024 | 001 | 004 |
| 0012 | 0025 | 002 | 005 |
| 0013 | 0026 | 003 | 006 |

For example, if it is determined that the K wavelengths include $\lambda_2$ and $\lambda_6$, it may be determined that an identifier of a corresponding first-level optical splitter reflection point is 0012, and an identifier of a corresponding second-level optical splitter reflection point is 0026; and correspondingly, an identification number of a corresponding first-level optical splitter port is 002, and an identification number of a corresponding second-level optical splitter port is 006.

In a specific scenario, a reflection wavelength of a first-level optical splitter reflection point may be the same as a reflection wavelength of a second-level optical splitter reflection point. For example, the scenario is shown in Table 4:

TABLE 4

| First-level optical splitter reflection wavelength | Second-level optical splitter reflection wavelength | First-level optical splitter port number | Second-level optical splitter port number |
|---|---|---|---|
| $\lambda_1$ | $\lambda_1$ | 001 | 001 |
| $\lambda_2$ | $\lambda_2$ | 002 | 002 |
| $\lambda_3$ | $\lambda_4$ | 003 | 004 |

If the K wavelengths include $\lambda_1$ and $\lambda_2$, it may be unable to distinguish whether $\lambda_1$ and $\lambda_2$ each correspond to a first-level optical splitter port or a second-level optical splitter port.

Figure 5:
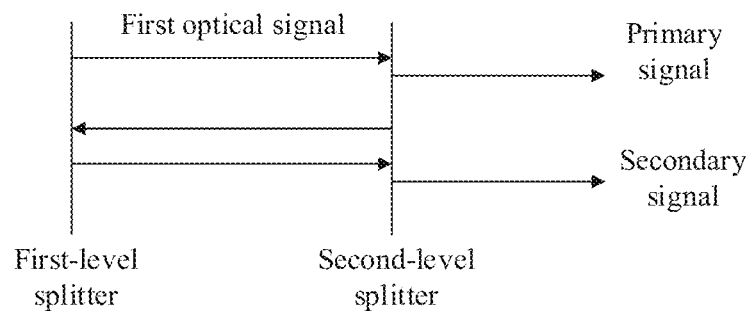
FIG. 5 is a schematic diagram of transmitting a primary signal and a secondary signal in a port detection method according to this application.

In the PON system to which the port detection method provided in this application is applied, an optical signal is transmitted to the first ONU by using a first-level optical splitter and a second-level optical splitter. As shown in FIG. 5, a first optical signal received by the first ONU is used as an example. In the optical transmission channel connected to the first ONU, a reflection point corresponding to the first optical signal is in the first-level optical splitter, and the second-level optical splitter does not reflect the first optical signal. In this case, a primary signal of the first optical signal is transmitted to the first ONU by using the first-level optical splitter and the second-level optical splitter. In addition, another port in the second-level optical splitter has a reflection point that reflects the first optical signal, and the reflection point may not be included in the optical transmission channel connected to the first ONU. Therefore, the first optical signal is reflected to the first-level optical splitter by the reflection point in the second-level optical splitter, then is reflected to the second-level optical splitter by the reflection point in the first-level optical splitter, and then is transmitted to the first ONU, so that the first ONU receives a secondary signal of the first optical signal. The primary signal and the secondary signal of the first optical signal may be used to determine the information about the optical splitter port corresponding to the first ONU. The following separately describes different cases.

In a possible implementation, the first optical signal received by the first ONU includes the primary signal and the secondary signal. The first optical signal is an optical signal corresponding to one of the K wavelengths. Optical power value of the primary signal is greater than optical power value of the secondary signal, and the first ONU first receives the primary signal of the first ONU, and then receives the secondary signal of the first ONU, that is, the primary signal is received by the first ONU before the secondary signal.

The OLT may determine, based on an optical power value of the primary signal of the first optical signal, the K smallest optical power values from the optical power values of the optical signals corresponding to the N wavelengths. It may be understood that the optical power values corresponding to the N wavelengths include the optical power value of the primary signal of the first optical signal. When determining the K smallest optical power values, the first ONU or the OLT performs comparison based on the optical power value of the primary signal of the first optical signal, to determine the K smallest optical power values.

Specifically, the information about the optical splitter port corresponding to the first ONU includes information about a first port corresponding to the first optical signal, for example, a port number, a port identifier, or a port name of the first port. The OLT may further determine the information about the first port based on information about the secondary signal of the first optical signal. The information about the secondary signal may include an optical power value of the secondary signal, or indication information that indicates that the first optical signal has the secondary signal. The first port may be understood as a port on which a disposed reflection point reflects the first optical signal.

For example, the OLT may receive the information that is about the secondary signal of the first optical signal and that is sent by the first ONU, where the information may specifically include the optical power value of the secondary signal or the indication information, and the indication information indicates that the first optical signal has the secondary signal. A quantity of times that the first ONU receives the secondary signal may be determined based on a quantity of optical splitter levels in the PON system. If the PON system has a larger quantity of optical splitter levels, for example, the PON system includes three levels of optical splitters or four levels of optical splitters, the first ONU receives the secondary signal for a larger quantity of times. After receiving the information about the secondary signal of the first optical signal, the OLT may determine, based on the information about the secondary signal, the port information of the first port corresponding to the first optical signal.

For example, the foregoing correspondence between a reflection wavelength of a reflection point and a port is shown in Table 5.

TABLE 5

| First-level optical splitter reflection wavelength | Second-level optical splitter reflection wavelength | First-level optical splitter port number | First-level optical splitter secondary signal identifier | Second-level optical splitter port number | Second-level optical splitter secondary signal identifier |
|---|---|---|---|---|---|
| $\lambda_1$ | $\lambda_1$ | 001 | 1 | 001 | 0 |
| $\lambda_2$ | $\lambda_2$ | 002 | 1 | 002 | 0 |
| $\lambda_3$ | $\lambda_4$ | 003 | 1 | 004 | 0 |

If the first-level optical splitter secondary signal identifier is 1, it indicates that an optical signal reflected by a first-level optical splitter reflection point has a secondary signal after being received by the first ONU: and if the second-level optical splitter secondary signal identifier is 0, it indicates that an optical signal reflected by a second-level optical splitter reflection point has no secondary signal after being received by the first ONU. Therefore, if the OLT determines that an optical signal that is of a wavelength Mu and that is received by the first ONU has a secondary signal, a secondary signal identifier corresponding to M is 1; and an optical signal of $\lambda_2$ has no secondary signal, that is, a secondary signal identifier corresponding to $\lambda_2$ is 0. In this case, the OLT may determine, based on the correspondence that is between a reflection wavelength of a reflection point and a port and that is shown in Table 5, that a port corresponding to $\lambda_1$ is in the first-level optical splitter, that is, a first-level optical splitter port number is 001, and a port corresponding to $\lambda_2$ is in the second-level optical splitter, that is, a second-level optical splitter port number is 002. Therefore, if the first ONU feeds back, to the OLT, two optical power values of the first optical signal in the optical signals corresponding to the K wavelengths, that is, the optical power value of the primary signal and the optical power value of the secondary signal of the first optical signal, the OLT may more accurately determine, based on the optical power value of the primary signal and the optical power value of the secondary signal, the information about the optical splitter port corresponding to the first ONU, thereby avoiding a case in which the information about the optical splitter port corresponding to the first ONU cannot be distinguished due to a same reflection wavelength of reflection points in different optical splitters, thereby improving accuracy of detecting the optical splitter port corresponding to the ONU.

In another possible implementation, because reflection points disposed in the first-level optical splitter and the second-level optical splitter may reflect optical signals corresponding to the same wavelength, after the K smallest optical power values are determined, the information about the at least K reflection points may be determined based on the K optical power values, that is, the quantity of determined reflection points may be greater than K. The information about the at least K reflection points includes information about a reflection point that reflects the first optical signal. The OLT may determine, based on information about the secondary signal of the first optical signal, the information about the reflection point that reflects the first optical signal, to determine information about a first port. The reflection point information is specifically, for example, a level of an optical splitter in which the reflection point is disposed, or a port identifier corresponding to the reflection point.

For example, a correspondence between reflection point information (a reflection point identifier is used as an example herein) and a wavelength is shown in Table 6.

TABLE 6

| First-level optical splitter reflection wavelength | First-level optical splitter secondary signal identifier | Second-level optical splitter reflection wavelength | Second-level optical splitter secondary signal identifier | First-level optical splitter reflection point identifier | Second-level optical splitter reflection point identifier |
|---|---|---|---|---|---|
| $\lambda_1$ | 1 | $\lambda_1$ | 0 | 0011 | 0021 |
| $\lambda_2$ | 1 | $\lambda_2$ | 0 | 0012 | 0022 |
| $\lambda_3$ | 1 | $\lambda_3$ | 0 | 0013 | 0026 |

If the first-level optical splitter secondary signal identifier is 1, it indicates that an optical signal reflected by a first-level optical splitter reflection point has a secondary signal after being received by the first ONU: and if the second-level optical splitter secondary signal identifier is 0, it indicates that an optical signal reflected by a second-level optical splitter reflection point has no secondary signal after being received by the first ONU. If it is determined that the K wavelengths include $\lambda_1$ and $\lambda_2$, and the OLT determines that the first ONU receives a secondary signal of an optical signal of $\lambda_1$, the OLT may determine that a secondary signal identifier corresponding to the optical signal of $\lambda_1$ is 1. In this case, the OLT may determine, based on the correspondence that is between reflection point information and a wavelength and that is shown in Table 6, that an identification number of a first-level optical splitter reflection point corresponding to the optical signal of $\lambda_1$ is 0011. An optical signal of $\lambda_2$ has no secondary signal, and a corresponding secondary signal identifier is 0. In this case, an identification number of a reflection point corresponding to the optical signal of $\lambda_2$ is 0022. Subsequently, the information about the optical splitter port corresponding to the first ONU may be determined based on the foregoing Table 3.

It should be noted that, in addition to using the first-level optical splitter secondary signal identifier or the second-level optical splitter secondary signal identifier in the foregoing Table 5 or Table 6, it may be alternatively indicated, in another manner, whether each level of optical splitter has a corresponding secondary signal. For example, a preset rule may be set, if an optical signal has a secondary signal, the OLT may directly determine, according to the preset rule, that a port corresponding to the optical signal is in the first-level optical splitter. The foregoing Table 5 and Table 6 are merely example descriptions, and constitute no limitation.

In a possible implementation, after step 306, the OLT may determine information about an optical splitter port corresponding to each ONU that is connected to the ODN, and the OLT records the information about the optical splitter port corresponding to each ONU, and stores the information about the optical splitter port corresponding to each ONU in a local or another memory. For example, a mapping table of each ONU and a connected port may be generated, or information about a connected port or the like is added to corresponding optical splitter information of each ONU, and is stored in a local memory.

Therefore, in this implementation of this application, the OLT may compare the optical power values of the optical signals that are of all of the N wavelengths and that are received by the first ONU, to determine the K smallest optical power values, and determine, based on the optical signal wavelengths that are in a one-to-one correspondence with the K optical power values, the information about the optical splitter port corresponding to the first ONU, so that the OLT can accurately determine the ODN port connected to the ONT, to avoid a manual recording error, and improve port detection efficiency. In addition, even if the ONU replaces a connected port, the OLT can accurately and quickly determine information about a replaced port of the ONU.

It should be noted that how to determine, when the first ONU is connected to a port on which a reflection point is disposed, the port connected to the first ONU is described above in this application. In another case, no reflection point may be disposed on some ports in the optical splitter, and a reflection point may not be disposed on the optical splitter port connected to the first ONU. In this case, the port connected to the first ONU may be determined in another manner. For example, if no reflection point is disposed on a port of an optical splitter in the ODN, and the optical splitter port connected to the first ONU does not reflect an optical signal, that is, no reflection point is disposed on the port, the optical power values of the optical signals that are of all of the N wavelengths and that are received by the first ONU approximate to each other or are equal to each other. Therefore, it may be determined, based on the fact that the optical power values of the optical signals corresponding to all of the N wavelengths approximate to each other or are equal to each other, that the optical splitter port connected to the first ONU is a port on which no reflection point is disposed. In addition, the port connected to the ONU may also be accurately and quickly determined, and no manual operation may be needed, thereby avoiding an error caused by a manual operation.

Scenario 2: An ONU performs port detection.

Figure 6:
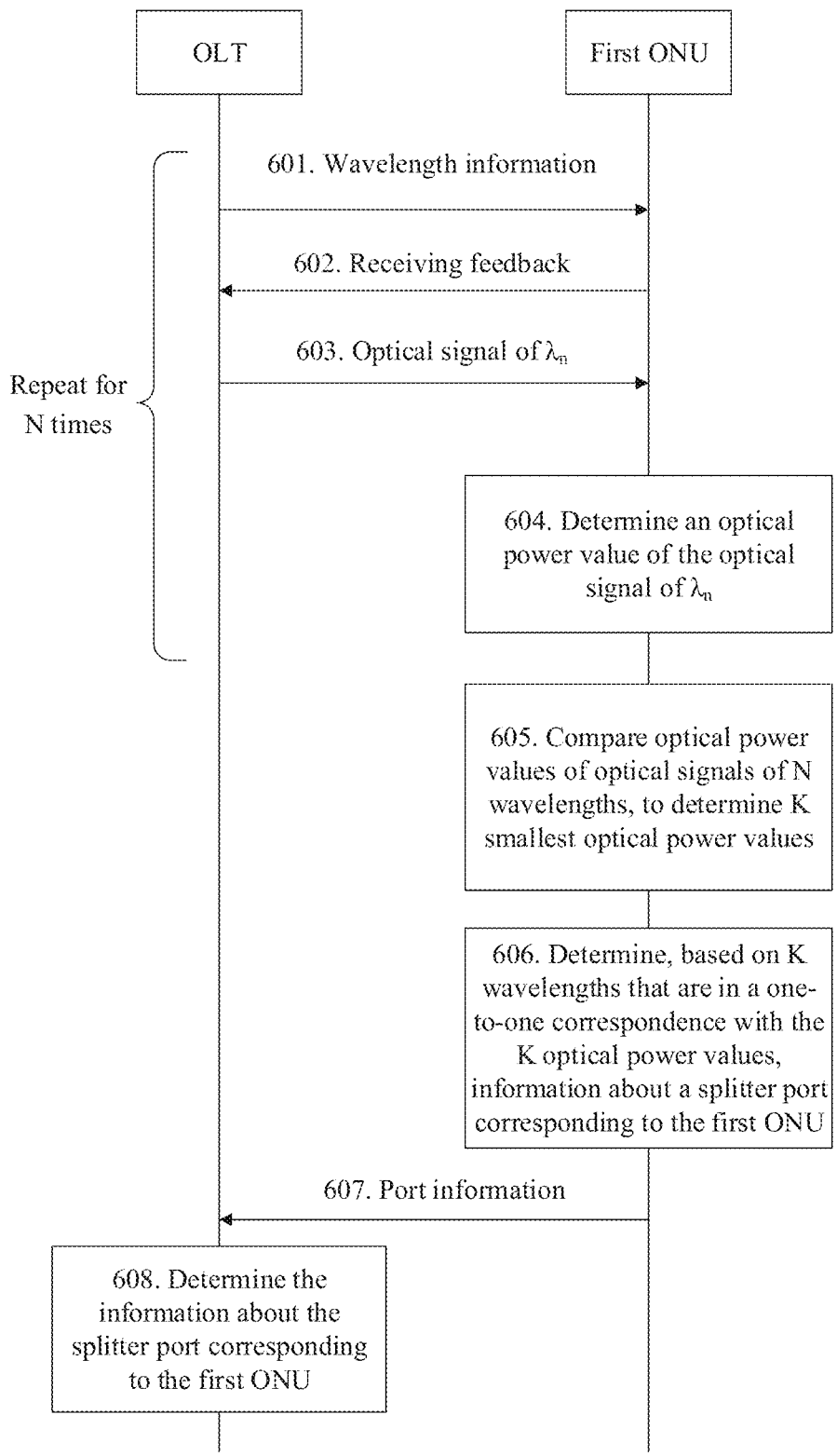
FIG. 6 is a schematic flowchart of another port detection method according to this application.

FIG. 6 is a schematic flowchart of another port detection method according to this application. The method is described below.

601. An OLT sends wavelength information to a first ONU.

602. The first ONU sends receiving feedback information to the OLT.

603. The OLT sends an optical signal of a wavelength $\lambda_n$ to the first ONU.

Steps 601 to 603 in this embodiment of this application are similar to the foregoing steps 301 to 303, and details are not described herein again.

604. The first ONU determines an optical power value of the optical signal of $\lambda_n$.

After receiving optical signals corresponding to all of N wavelengths, the first ONU determines optical power values of the optical signals corresponding to all of the N wavelengths, without sending the optical power values to the OLT.

It should be understood that if the OLT sends the optical signals corresponding to all of the N wavelengths to the first ONU, steps 601 to 604 may be repeated for N times.

605. The first ONU compares optical power values of optical signals corresponding to the N wavelengths, to determine K smallest optical power values.

606. The first ONU determines, based on optical signal wavelengths that are in a one-to-one correspondence with the K optical power values, information about an optical splitter port corresponding to the first ONU.

Steps 605 and 606 in this embodiment of this application are similar to the foregoing steps 305 and 306, and the OLT in steps 305 and 306 is replaced with the first ONU. Details are not described herein again.

607. The first ONU sends the information about the corresponding optical splitter port to the OLT.

After obtaining the information about the optical splitter port corresponding to the first ONU, the first ONU may send the information about the optical splitter port corresponding to the first ONU to the OLT. For the port information, refer to the foregoing related description in step 204.

When the information about the port connected to the first ONU is sent, the information may further carry an identifier of the first ONU, so that the OLT identifies that the port information is the information about the port corresponding to the first ONU.

608. The OLT determines the information about the optical splitter port corresponding to the first ONU.

After receiving the port information fed back by the first ONU, the OLT determines, based on the received port information, information about a port in an optical transmission channel connected to the first ONU. For example, if a PON system includes two levels of optical splitters, the port information may include a sequence number of a second-level optical splitter port directly connected to the first ONU and a sequence number of a first-level optical splitter port indirectly connected to the first ONU in the optical transmission channel connected to the first ONU, and the like.

Therefore, in this implementation of this application, the ONU may determine, based on the optical power values of the N wavelengths, the information about the port corresponding to the ONU, and send the information to the OLT, so that the OLT can accurately and quickly determine information about a port corresponding to each ONU. Compared with manual recording, in this application, port determining efficiency can be improved, and a port recording error rate can be reduced. In addition, even if the ONU switches a connected port, the OLT can quickly and accurately determine a port to which the ONU switches, thereby further improving efficiency of determining the information about the optical splitter port corresponding to the ONU.

For example, with reference to FIG. 2 to FIG. 6, the following describes the foregoing port detection method in more detail by using a more specific scenario.

Figure 7:
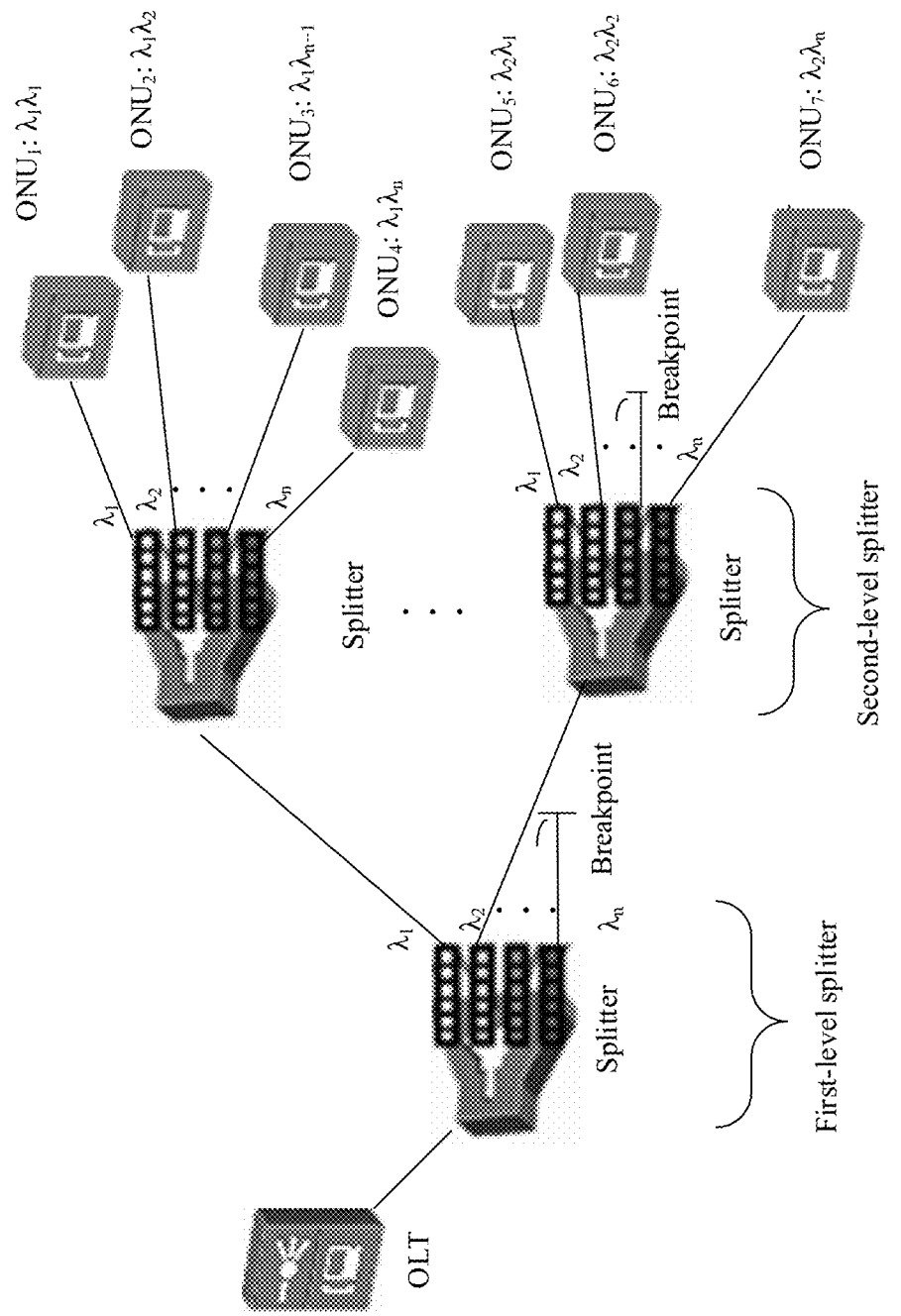
FIG. 7 is a schematic structural diagram of another PON system to which this application is applied.

As shown in FIG. 7, a PON system provided in this application may include an OLT, an ODN, and at least one ONU (an $ONU_1$ to an $ONU_7$ shown in FIG. 7). The ODN may include a first-level optical splitter and a second-level optical splitter. The first-level optical splitter includes one optical splitter, the optical splitter includes n output ends, and reflection wavelengths of reflection points at the output ends of the optical splitter are respectively $\lambda_1$ to $\lambda_n$. The second-level optical splitter includes n optical splitters, reflection wavelengths of reflection points at output ends of each of the n optical splitters are also respectively $\lambda_1$ to $\lambda_n$, and the output end of each optical splitter in the second-level optical splitter may be connected to an ONU. For example, the $ONU_1$ is connected to a second-level optical splitter port of a reflection wavelength $\lambda_1$, and a corresponding first-level optical splitter reflection wavelength is $\lambda_1$; the $ONU_2$ is connected to a second-level optical splitter port of a reflection wavelength $\lambda_2$, and a corresponding first-level optical splitter reflection wavelength is $\lambda_1$; the $ONU_3$ is connected to a second-level optical splitter port of a reflection wavelength $\lambda_{n-1}$, and a corresponding first-level optical splitter reflection wavelength is $\lambda_1$: the $ONU_4$ is connected to a second-level optical splitter port of a reflection wavelength $\lambda_n$, and a corresponding first-level optical splitter reflection wavelength is $\lambda_1$: the ONUs is connected to a second-level optical splitter port of a reflection wavelength $\lambda_1$, and a corresponding first-level optical splitter reflection wavelength is $\lambda_2$: the $ONU_6$ is connected to a second-level optical splitter port of a reflection wavelength $\lambda_2$, and a corresponding first-level optical splitter reflection wavelength is $\lambda_2$; and the ONU is connected to a second-level optical splitter port of a reflection wavelength $\lambda_n$, and a corresponding first-level optical splitter reflection wavelength is $\lambda_2$. Certainly, some output ends may not be connected to devices, as shown by breakpoints shown in FIG. 7.

In addition, the PON system may further include a monitoring light source, such as a monitoring laser, a tunable laser, or the like (not shown in the figure). The monitoring light source may be disposed inside the OLT, or may be disposed independently of the OLT. For example, when a tunable laser is disposed independently of the OLT, if the OLT needs to send a monitoring optical signal, the OLT may instruct, by using a control system, the tunable laser to send monitoring light to the ODN.

To avoid interference with data transmission, when there is no data transmission, the OLT may deliver a signal to the ONU by using service light, to instruct the ONU to start a wavelength scanning program: and deliver wavelength information to the ONU, to notify the ONU of a wavelength of a to-be-sent optical signal. $\lambda_1$ is used as an example. The OLT may send a wavelength code of $\lambda_1$ to the ONU, to notify the ONU that the wavelength of the to-be-sent optical signal is $\lambda_1$.

After receiving the signal and the wavelength code of $\lambda_1$, the ONU sends receiving feedback information to the OLT by using service light, to indicate that the ONU has received the signal and the wavelength information.

Then, the OLT starts the tunable laser, to broadcast an optical signal of the wavelength Mu to the ONUs that are connected to the ODN.

After each ONU receives the optical signal of the wavelength $\lambda_1$, if the OLT performs port detection, each ONU sends feedback information to the OLT. The feedback information may include optical power value of the optical signal that is of the wavelength $\lambda_1$ and that is received by the ONU. If the ONU performs port detection, the ONU may not send the optical power value of the optical signal of the wavelength Mu to the OLT.

Then, the OLT repeats the foregoing step, and after sending optical signals corresponding to the wavelengths $\lambda_1$ to $\lambda_n$, the OLT completes sending of optical signals corresponding to all of the N wavelengths.

In addition to sending feedback information to the OLT each time receiving an optical signal, the ONU may alternatively send, after receiving the optical signals corresponding to the N wavelengths, optical power values of the optical signals corresponding to the N wavelengths to the OLT by using one feedback message.

If the ONU performs port detection, after determining information about a corresponding optical splitter port based on the optical signals corresponding to the N wavelengths, the ONU sends the port information to the OLT.

The $ONU_1$ is used as an example, and that the OLT or the $ONU_1$ determines, based on optical power value of the optical signals that are of all of the N wavelengths and that are received by the $ONU_1$, ports connected to the $ONU_1$ may include the following specific steps: The optical power value of the optical signals that are of all of the N wavelengths (wavelengths to in) and that are received by the ONU is compared. The PON system shown in FIG. 7 includes two levels of optical splitters, and one transmission channel corresponds to two reflection points. Therefore, two smallest optical power values are determined, and optical signal wavelengths (namely, K wavelengths) that are in a one-to-one correspondence with the two optical power values, that is, $\lambda_1$ and $\lambda_2$, are determined.

Then, it may be determined that wavelengths of optical signals reflected by reflection points disposed in a transmission channel connected to the $ONU_1$ are $\lambda_1$ and $\lambda$ 2. If a first-level optical splitter reflection point and a second-level optical splitter reflection point have different reflection wavelengths in the PON system, information about the optical splitter ports corresponding to the ONU may be directly determined based on $\lambda_1$, $\lambda_2$, and a preset mapping relationship between a wavelength and a port.

If a first-level optical splitter reflection point and a second-level optical splitter reflection point have a same reflection wavelength in the PON system, levels of optical splitters in which reflection points respectively corresponding to $\lambda_1$ and $\lambda_2$ are disposed may be unable to be distinguished based on only $\lambda_1$ and $\lambda_2$. For example, in both optical transmission channels connected to the $ONU_2$ and the $ONU_5$, reflection wavelengths of reflection points are $\lambda_1$ and $\lambda_2$, and specific levels of optical splitters in which reflection points respectively corresponding to the reflection wavelengths $\lambda_1$ and $\lambda_2$ in the optical transmission channels connected to the $ONU_2$ and the $ONU_5$ are disposed may be unable to be distinguished. Therefore, in this embodiment of this application, the ONU or the OLT may further distinguish, based on a primary signal and a secondary signal of an optical signal, specific levels of optical splitters in which reflection points in an optical transmission channel connected to the ONU are disposed.

Figure 8:
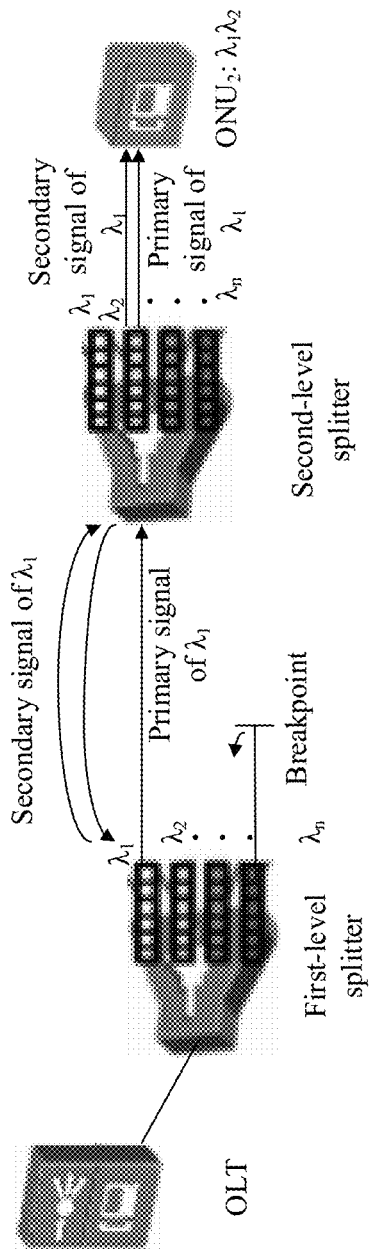
FIG. 8 is another schematic diagram of transmitting a primary signal and a secondary signal in a port detection method to which this application is applied.
Figure 9:
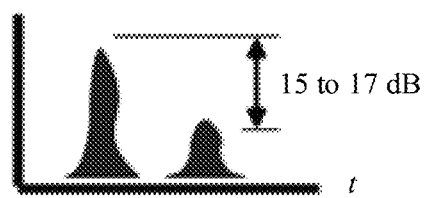
FIG. 9 is another schematic diagram of an optical power value in a port detection method to which this application is applied.

For example, as shown in FIG. 8, after being transmitted from the laser to the first-level optical splitter, an optical signal of the wavelength $\lambda_1$ is reflected by a reflection point of $\lambda_1$ to reduce optical power, and then is transmitted to the $ONU_2$ by using a second-level optical splitter, that is, the $ONU_2$ receives a primary signal of the optical signal of $\lambda_1$. In addition, when the optical signal that is of $\lambda_1$ and that is reflected by the reflection point of $\lambda_1$ in the first-level optical splitter is transmitted to the second-level optical splitter, because a reflection point of $\lambda_1$ is disposed in the second-level optical splitter, the optical signal of $\lambda_1$ is reflected to the first-level optical splitter by the reflection point in the second-level optical splitter, and then is reflected to the second-level optical splitter by the reflection point of 21 in the first-level optical splitter and is transmitted to the $ONU_2$, that is, the $ONU_2$ receives a secondary signal of the optical signal of $\lambda_1$. The $ONU_2$ first receives the primary signal of the optical signal of $\lambda_1$, and then receives the secondary signal of the optical signal of $\lambda_1$, and because the secondary signal is reflected for a plurality of times, optical power value of the secondary signal is lower than optical power value of the primary signal. As shown in FIG. 9, an optical power difference between the primary signal and the secondary signal of the optical signal of $\lambda_2$ may be 15 to 17 dB. The OLT may determine, based on information about the secondary signal of the optical signal of $\lambda_1$, and based on a preset mapping relationship or according to a preset rule, that a reflection point that reflects the optical signal of $\lambda_1$ is disposed in the first-level optical splitter, and a reflection point that reflects an optical signal of the wavelength $\lambda_2$ is disposed in the second-level optical splitter. Therefore, the OLT may further more accurately determine, based on the primary signal and the secondary signal of the optical signal of $\lambda_1$, that in an optical transmission channel connected to the $ONU_2$, a reflection point that reflects the optical signal of $\lambda_1$ is in the first-level optical splitter and a reflection point that reflects the optical signal of $\lambda_2$ is in the second-level optical splitter.

Therefore, in this implementation of this application, even if reflection points corresponding to ports in optical transmission channels connected to some $ONU_s$ have a same reflection wavelength, a specific port corresponding to each ONU can be distinguished based on a primary signal and a secondary signal, so that information about a port in an optical transmission channel connected to the ONU can be more accurately determined, thereby improving port detection accuracy, and improving port detection efficiency.

The foregoing describes in detail the port detection method provided in this application. The following describes, with reference to FIG. 2 to FIG. 9, an apparatus provided in this application.

This application provides an optical network device configured to perform the methods corresponding to FIG. 2 to FIG. 9. The optical network device may be an OLT, or may be an ONU. The following separately describes the OLT and the ONU.

Figure 10:
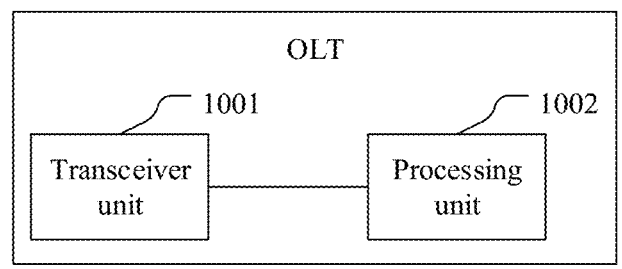
FIG. 10 is a schematic structural diagram of an OLT to which this application is applied.

FIG. 10 is a schematic structural diagram of an OLT according to this application. The OLT may be configured to perform the step performed by the OLT in any one of the implementations in FIG. 2 to FIG. 9. Specifically, the OLT may include a transceiver unit 1001 and a processing unit 1002.

The transceiver unit 1001 is configured to send optical signals corresponding to all of N wavelengths to at least one optical network unit (ONU), where the N wavelengths are different from each other, and N is a positive integer.

The sending optical signals corresponding to all of N wavelengths to at least one optical network unit (ONU) is an optional step of the transceiver unit 1001, and optical signals corresponding to the N wavelengths may be all or some of optical signals received by each ONU.

The transceiver unit 1001 is further configured to receive optical power information sent by a first ONU, where the optical power information includes optical power values of the optical signals that are of all of the N wavelengths and that are received by the first ONU, and the first ONU is any one of the at least one ONU.

The processing unit 1002 is configured to determine, based on the optical power information, information about an optical splitter port corresponding to the first ONU.

The optical power information may be one piece of feedback information, including the optical power values of the optical signals corresponding to all of the N wavelengths; or the optical power information may be at least N pieces of feedback information, where each piece of feedback information includes an optical power value of an optical signal of one wavelength.

In a possible implementation, the optical signals that are of all of the N wavelengths and that are received by the first ONU may be alternatively sent by a laser independent of the OLT, for example, a tunable laser.

In a possible implementation, if N=K, the processing unit 1002 may be specifically configured to determine, based on the N wavelengths and a preset mapping relationship between a wavelength and a port, the information about the optical splitter port corresponding to the first ONU.

In addition, if N>K, in a possible implementation, the processing unit 1002 is specifically configured to:
  determine K smallest optical power values from optical power values of the optical signals corresponding to the N wavelengths, where the optical power values of the optical signals corresponding to the N wavelengths include the optical power values of the optical signals that are of all of the N wavelengths and that are received by the first ONU, and K is a positive integer;
  determine optical signal wavelengths that are in a one-to-one correspondence with the K optical power values, to obtain K wavelengths; and determine, based on the K wavelengths, the information about the optical splitter port corresponding to the first ONU.

Specifically, the processing unit 1002 may be configured to: in a scenario in which differences between the optical power values of the optical signals corresponding to the N wavelengths include a difference greater than a threshold, determine the K smallest optical power values from the optical power values of the optical signals corresponding to the N wavelengths.

In a possible implementation, optical signals corresponding to the K wavelengths are transmitted to the first ONU by using an optical distribution network (ODN), at least one optical splitter is disposed in the ODN, a reflection point is disposed at each output end of each of the at least one optical splitter, and the reflection point is configured to reflect an optical signal of a first preset wavelength; and
  the processing unit 1002 is specifically configured to:
  determine information about at least K reflection points based on the K wavelengths, where the at least K reflection points reflect the optical signals corresponding to the K wavelengths, and each of the at least K reflection points reflects an optical signal of one of the K wavelengths; and
  determine, based on the information about the at least K reflection points, the information about the optical splitter port corresponding to the first ONU.

In addition, alternatively, reflection points may not need to be disposed at all branch ends of each optical splitter in the ODN, and reflection points may be disposed at a plurality of branch ends of each of the at least one optical splitter in the ODN. The plurality of branch ends may be all or some of branch ends of the optical splitter.

In a possible implementation, the processing unit 1002 is specifically configured to:
  if N is greater than L, and differences between optical power values of the optical signals corresponding to the N wavelengths include a difference greater than a threshold, determine L largest optical power values from the optical power values of the optical signals corresponding to the N wavelengths, where the optical power values of the optical signals corresponding to the N wavelengths include the optical power values of the optical signals that are of all of the N wavelengths and that are received by the first ONU, and L is a positive integer; determine optical signal wavelengths that are in a one-to-one correspondence with the L optical power values, to obtain L wavelengths; and determine, based on the L wavelengths, the information about the optical splitter port corresponding to the first ONU.

In a possible implementation, optical signals corresponding to the L wavelengths are transmitted to the first ONU by using an optical distribution network (ODN), at least one optical splitter is disposed in the ODN, transmittance points are disposed at a plurality of branch ends of each of the at least one optical splitter, and the transmittance point is configured to transmit an optical signal of a second preset wavelength; and
  the processing unit 1002 is further configured to: determine information about at least one transmittance point based on the L wavelengths, where the at least one transmittance point transmits the optical signals corresponding to the L wavelengths; and determine, based on the information about the at least one transmittance point, the information about the optical splitter port corresponding to the first ONU.

In a possible implementation, if N is greater than K or N is greater than L, and none of the differences between the optical power values of the optical signals corresponding to the N wavelengths is greater than the threshold, the processing unit 1002 is specifically configured to determine, from at least one preset port of the optical splitter, the port corresponding to the first ONU.

In a possible implementation, if N=K, the processing unit 1002 is specifically configured to determine, based on the N wavelengths and a preset mapping relationship between a wavelength and a port, the information about the optical splitter port corresponding to the first ONU.

In a possible implementation, if N=L, the processing unit 1002 is specifically configured to determine, based on the N wavelengths and a preset mapping relationship between a wavelength and a port, the information about the optical splitter port corresponding to the first ONU.

In a possible implementation, a first optical signal received by the first ONU includes a primary signal and a secondary signal, an optical power value of the primary signal is greater than an optical power value of the secondary signal, and the first optical signal is an optical signal corresponding to one of the K wavelengths; and the processing unit 1002 is specifically configured to determine, based on the optical power value of the primary signal of the first optical signal, the K smallest optical power values from the optical power values of the optical signals corresponding to the N wavelengths.

In a possible implementation, the port information includes information about a first port corresponding to the first optical signal, the information about the first port corresponding to the first optical signal is determined by the processing unit 1002 based on information about the secondary signal, and the information about the secondary signal is sent by the first ONU to the OLT.

In a possible implementation, the transceiver unit 1001 is further configured to send indication information, where the indication information is used to indicate the laser to send a second optical signal, the indication information includes information about a wavelength of the second optical signal, and the second optical signal is an optical signal corresponding to any one of the N wavelengths.

In a possible implementation, the transceiver unit 1001 is further configured to: before sending the indication information, send the information about the wavelength of the second optical signal to the at least one ONU.

In a possible implementation, the transceiver unit 1001 is further configured to receive identification information of the first ONU that is sent by the first ONU.

In a possible implementation, the transceiver unit 1001 may be further configured to directly receive the port information fed back by the first ONU, so that the processing unit 1002 can directly determine, based on the port information received by the transceiver unit 1001, the information about the optical splitter port corresponding to the first ONU.

Figure 11:
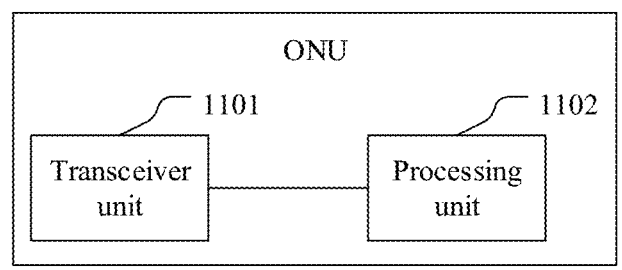
FIG. 11 is a schematic structural diagram of an ONU to which this application is applied.

FIG. 11 is a schematic structural diagram of an ONU according to this application. The ONU may be configured to perform the step performed by the ONU in any one of the implementations in FIG. 2 to FIG. 9. Specifically, the ONU may include a transceiver unit 1101 and a processing unit 1102.

The transceiver unit 1101 is configured to receive optical signals corresponding to all of N wavelengths, where the N wavelengths are different from each other, and N is a positive integer.

The processing unit 1102 is configured to determine optical power values of the received optical signals corresponding to all of the N wavelengths.

The processing unit 1102 is further configured to generate at least one piece of feedback information based on the optical power values of the optical signals corresponding to all of the N wavelengths.

The transceiver unit 1101 is further configured to send the at least one piece of feedback information to an optical line terminal (OLT).

In a possible implementation, the at least one piece of feedback information includes the optical power values of the optical signals corresponding to all of the N wavelengths.

In a possible implementation, the at least one piece of feedback information may alternatively include K smallest optical power values or K wavelengths corresponding to the K smallest optical power values, so that the OLT can determine, based on the K wavelengths corresponding to the K smallest optical power values and a mapping relationship between a wavelength and a port, information about an optical splitter port corresponding to the ONU.

In a possible implementation, the at least one piece of feedback information may alternatively include L largest optical power values or L wavelengths corresponding to the L largest optical power values, so that the OLT can determine, based on the L wavelengths corresponding to the L largest optical power values and a mapping relationship between a wavelength and a port, information about an optical splitter port corresponding to the ONU.

In a possible implementation, the processing unit 1102 is specifically configured to: determine K smallest optical power values from optical power values of optical signals corresponding to the N wavelengths, where the optical power values of the optical signals corresponding to the N wavelengths include the optical power values of the optical signals that are of all of the N wavelengths and that are received by the ONU, and K is a positive integer: determine optical signal wavelengths that are in a one-to-one correspondence with the K optical power values, to obtain K wavelengths: determine, based on the K wavelengths, information about an optical splitter port corresponding to the ONU: and generate the at least one piece of feedback information, where the at least one piece of feedback information includes the information about the optical splitter port corresponding to the ONU.

The processing unit may be specifically configured to: in a scenario in which differences between the optical power values of the optical signals corresponding to the N wavelengths include a difference greater than a threshold, determine the K smallest optical power values from the optical power values of the optical signals corresponding to the N wavelengths: then determine the optical signal wavelengths that are in a one-to-one correspondence with the K optical power values, to obtain the K wavelengths: determine, based on the K wavelengths, the information about the optical splitter port corresponding to the ONU; and generate the at least one piece of feedback information, where the at least one piece of feedback information includes the information about the optical splitter port corresponding to the ONU.

In a possible implementation, optical signals corresponding to the K wavelengths are transmitted to the ONU by using an optical distribution network (ODN), at least one optical splitter is disposed in the ODN, a reflection point is disposed at each output end of each of the at least one optical splitter, and the reflection point is configured to reflect an optical signal of a first preset wavelength: and the processing unit 1102 is specifically configured to:
   determine information about at least K reflection points based on the K wavelengths, where the at least K reflection points reflect the optical signals corresponding to the K wavelengths, and each of the at least K reflection points reflects an optical signal corresponding to one of the K wavelengths: and determine, based on the information about the at least K reflection points, the information about the optical splitter port corresponding to the ONU.

In addition, alternatively, reflection points may not need to be disposed at all branch ends of each optical splitter in the ODN, and reflection points may be disposed at a plurality of branch ends of each of the at least one optical splitter in the ODN. The plurality of branch ends may be all or some of branch ends of the optical splitter.

In a possible implementation, the processing unit 1102 is specifically configured to:
   if none of the differences between the optical power values of the optical signals corresponding to the N wavelengths is greater than the threshold, determine, from at least one preset port of the optical splitter, the port corresponding to the ONU.

In a possible implementation, a first optical signal includes a primary signal and a secondary signal, an optical power value of the primary signal is greater than an optical power value of the secondary signal, and the first optical signal is an optical signal of one of the K wavelengths; and
   the processing unit 1102 is specifically configured to determine, based on the optical power value of the primary signal of the first optical signal, the K smallest optical power values from the optical power values of the optical signals corresponding to the N wavelengths.

In a possible implementation, the port information includes information about a first port corresponding to the first optical signal, the information about the first port corresponding to the first optical signal is determined by the processing unit 1102 based on information about the secondary signal; and the transceiver unit 1101 is further configured to send the information about the secondary signal to the OLT.

In a possible implementation, the transceiver unit 1101 is further configured to: before the ONU receives the optical signals corresponding to all of the N wavelengths, receive information that is about a wavelength of a second optical signal and that is sent by the OLT, where the second optical signal is an optical signal of any one of the N wavelengths.

In a possible implementation, the transceiver unit 1101 is further configured to send identification information of the ONU to the OLT.

In a possible implementation, the optical signals corresponding to the N wavelengths are sent by the OLT to the ONU, or the optical signals corresponding to the N wavelengths are sent by a laser to the ONU.

Figure 12:
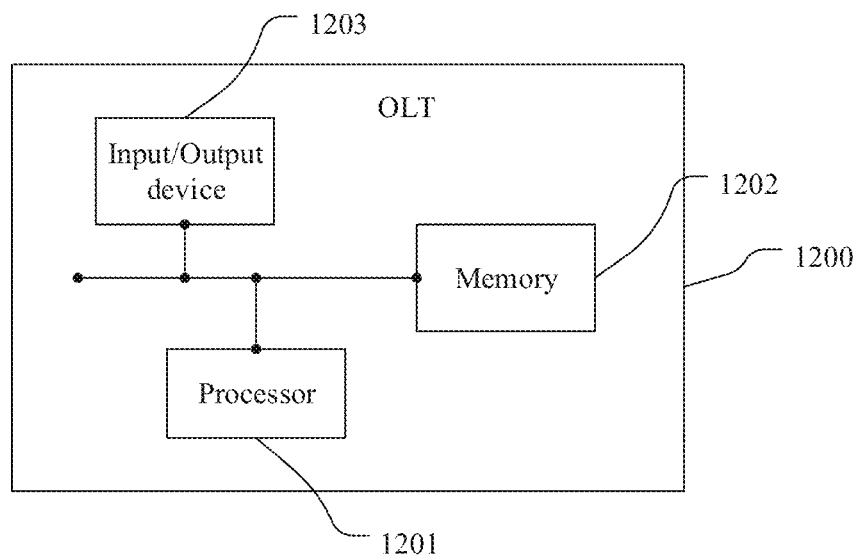
FIG. 12 is a schematic structural diagram of another OLT to which this application is applied.

This application further provides an OLT 1200. Refer to FIG. 12. In an embodiment of the OLT in the embodiments of this application, the OLT may be configured to perform the step performed by the OLT in any one of the embodiments shown in FIG. 2 to FIG. 9. Refer to the related description in the foregoing method embodiments.

The OLT 1200 includes a processor 1201, a memory 1202, and an input/output device 1203.

In a possible implementation, the processor 1201, the memory 1202, and the input/output device 1203 are separately connected to a bus, and the memory stores computer instructions.

The transceiver unit 1001 in the foregoing embodiment may be the input/output device 1203 in this embodiment. Therefore, implementation of the input/output device 1203 is not described.

The processing unit 1002 in the foregoing embodiment may be the processor 1201 in this embodiment. Therefore, implementation of the processor 1201 is not described.

In an implementation, the OLT 1200 may include more or fewer components than those in FIG. 12. This is merely an example description in this application and constitutes no limitation.

Figure 13:
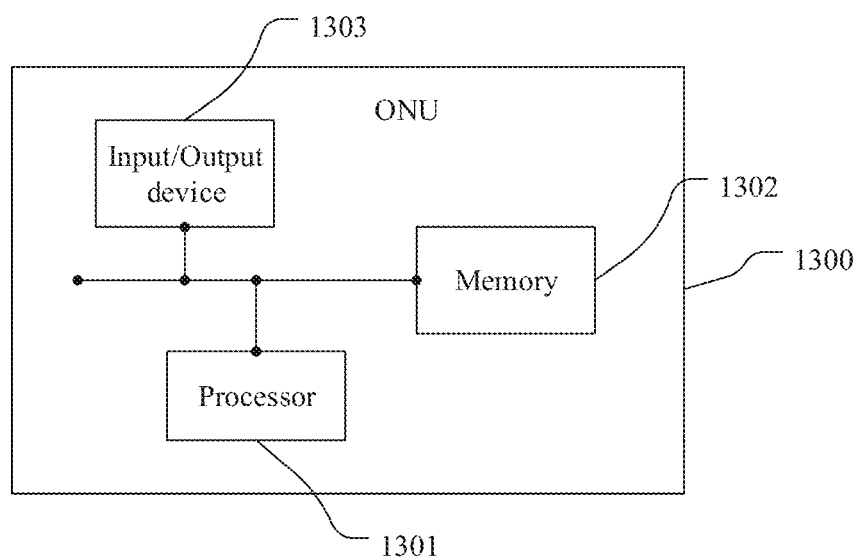
FIG. 13 is a schematic structural diagram of another ONU to which this application is applied.

This application further provides an ONU 1300. Refer to FIG. 13. In an embodiment of the ONU in the embodiments of this application, the ONU may be configured to perform the step performed by the ONU in any one of the embodiments shown in FIG. 2 to FIG. 9. Refer to the related description in the foregoing method embodiments.

The ONU 1300 includes a processor 1301, a memory 1302, and an input/output device 1303.

In a possible implementation, the processor 1301, the memory 1302, and the input/output device 1303 are separately connected to a bus, and the memory stores computer instructions.

The transceiver unit 1101 in the foregoing embodiment may be the input/output device 1303 in this embodiment. Therefore, implementation of the input/output device 1303 is not described.

The processing unit 1102 in the foregoing embodiment may be the processor 1301 in this embodiment. Therefore, implementation of the processor 1301 is not described.

In an implementation, the ONU 1300 may include more or fewer components than those in FIG. 13. This is merely an example description in this application and constitutes no limitation.

In a possible implementation, the input/output device of the ONU may include at least one receiver. The ONU may receive, by using a same receiver, a service optical signal and a monitoring optical signal that are sent by an OLT, or may separately receive, by using different receivers, a service optical signal and a monitoring optical signal.

This application further provides a PON system, and the PON system may include an ONU and an OLT.

There may be one or more ONUs.

The OLT is the server shown in FIG. 10 or FIG. 12, and may be configured to perform the step performed by the OLT in any one of the implementations shown in FIG. 2 to FIG. 9.

The ONU is the ONU shown in FIG. 11 or FIG. 13, and may be configured to perform the step performed by the ONU in any one of the implementations shown in FIG. 2 to FIG. 9.

This application provides a port detection apparatus. The port detection apparatus may be applied to a device such as an OLT or an ONU. The port detection apparatus is coupled to a memory, and is configured to read and execute instructions stored in the memory, so that the port detection apparatus implements the steps of the method performed by the OLT or the ONU in any one of the implementations in FIG. 2 to FIG. 9. In a possible design, the port detection apparatus is a chip or a system on chip.

This application provides a chip system. The chip system includes a processor, configured to support an OLT or an ONU in implementing functions in the foregoing aspects, for example, sending or processing data and/or information in the foregoing methods. In a possible design, the chip system further includes a memory. The memory is configured to store necessary program instructions and data. The chip system may include a chip, or may include a chip and another discrete component.

In another possible design, when the chip system is a chip in an OLT, an ONU, or the like, the chip includes a processing unit and a communications unit. The processing unit may be, for example, a processor. The communications unit may be, for example, an input/output interface, a pin, or a circuit. The processing unit may execute computer executable instructions stored in a storage unit, to enable the chip in the OLT, the ONU, or the like to perform the steps of the method performed by the OLT or the ONU in any one of the embodiments in FIG. 2 to FIG. 9. Optionally, the storage unit is a storage unit in the chip, for example, a register or a buffer. Alternatively, the storage unit may be a storage unit in the OLT, the ONU, or the like but outside the chip, for example, a read-only memory (ROM), another type of static storage device that can store static information and instructions, or a random access memory (RAM).

An embodiment of this application further provides a processor, configured to be coupled to a memory. The processor is configured to perform the method and the function of the OLT in any one of the foregoing embodiments.

An embodiment of this application further provides a processor, configured to be coupled to a memory. The processor is configured to perform the method and the function of the ONU in any one of the foregoing embodiments.

An embodiment of this application further provides a computer-readable storage medium, and the computer-readable storage medium stores a computer program. When the computer program is executed by a computer, a method procedure related to the OLT or the ONU in any one of the foregoing method embodiments is implemented. Correspondingly, the computer may be the foregoing OLT or ONU.

It should be understood that the processor mentioned in the OLT, the ONU, the chip system, or the like in the foregoing embodiments of this application, or the processor provided in the foregoing embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that there may be one or more processors in the OLT, the ONU, the chip system, and the like in the foregoing embodiments of this application. The quantity may be adjusted based on an actual application scenario. This is merely an example for description herein, and is not limited. There may be one or more memories in the embodiments of this application. The quantity may be adjusted based on an actual application scenario. This is merely an example for description herein, and is not limited.

It should be further understood that in the embodiments of this application, the memory, the readable storage medium, or the like mentioned in the OLT, the ONU, the chip system, or the like in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be further noted that when the OLT or the ONU includes a processor (or a processing unit) and a memory, the processor in this application may be integrated with the memory, or may be connected to the memory by using an interface. This may be adjusted based on an actual application scenario, and is not limited.

An embodiment of this application further provides a computer program or a computer program product including the computer program. When the computer program is executed on a computer, the computer is enabled to implement a method procedure related to the OLT or the ONU in any one of the foregoing method embodiments. Correspondingly, the computer may be the foregoing OLT or ONU.

All or some of the foregoing embodiments in FIG. 2 to FIG. 9 may be implemented by using software, hardware, firmware, or any combination thereof. When software is used to implement the embodiments, all or some of the foregoing embodiments may be implemented in a form of a computer program product.

The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or another network device) to perform all or some of the steps of the methods in the embodiments in FIG. 2 to FIG. 9 of this application. The storage medium includes various media that can store program code, such as a USB flash drive, a removable hard disk, a read-only memory (ROM), a random access memory (RAM), a magnetic disk, or an optical disc.

In the specification, claims, and the accompanying drawings of this application, the terms "first", "second", and the like are intended to distinguish similar objects but do not necessarily indicate a specific order or sequence. It should be understood that the terms used in such a way are interchangeable in proper cases. This is merely a discrimination manner that is used when objects having a same attribute are described in the embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

Names of messages/frames/information, modules, units, or the like provided in the embodiments of this application are merely examples, and other names may be used provided that the messages/frames/information, modules, units, or the like have same functions.

The terms used in the embodiments of this application are merely for the purpose of illustrating specific embodiments, and are not intended to limit the present invention. The terms "a", "the", and "this" of singular forms used in the embodiments and the appended claims of this application are also intended to include plural forms, unless otherwise specified in a context clearly. In the descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A port detection method, comprising:
    receiving, by an optical line terminal (OLT), optical power values that are of optical signals corresponding to all of N wavelengths and that are sent by a first optical network unit (ONU), wherein the N wavelengths are wavelengths of optical signals received by the first ONU, the N wavelengths are different from each other, and N is a positive integer; and
    determining, by the OLT based on the optical power values of the optical signals corresponding to all of the N wavelengths, information about an optical splitter port corresponding to the first ONU.

2. The method according to claim 1, wherein when N is greater than K, the determining, by the OLT based on the optical power values of the optical signals corresponding to all of the N wavelengths, information about the optical splitter port corresponding to the first ONU comprises:
    when differences between the optical power values of the optical signals corresponding to the N wavelengths comprise a difference greater than a threshold, determining, by the OLT, K smallest optical power values from the optical power values of the optical signals corresponding to the N wavelengths, wherein the optical power values of the optical signals corresponding to the N wavelengths comprise the optical power values of the optical signals that are of all of the N wavelengths and that are received by the first ONU, and K is a positive integer;
    determining, by the OLT, optical signal wavelengths that are in a one-to-one correspondence with the K optical power values, to obtain K wavelengths; and
    determining, by the OLT based on the K wavelengths, the information about the optical splitter port corresponding to the first ONU.

3. The method according to claim 2, wherein optical signals corresponding to the K wavelengths are transmitted to the first ONU by using an optical distribution network (ODN), at least one optical splitter is disposed in the ODN, reflection points are disposed at a plurality of branch ends of each of the at least one optical splitter, and the reflection point is configured to reflect an optical signal of a first preset wavelength; and
    wherein the determining, by the OLT based on the K wavelengths, the information about the optical splitter port corresponding to the first ONU comprises:
    determining, by the OLT, information about at least K reflection points based on the K wavelengths, wherein each of the at least K reflection points reflects an optical signal of one of the K wavelengths; and
    determining, by the OLT based on the information about the at least K reflection points, the information about the optical splitter port corresponding to the first ONU.

4. The method according to claim 2, wherein when N is greater than K, the method further comprises:
    when none of the differences between the optical power values of the optical signals corresponding to the N wavelengths is greater than the threshold, determining, by the OLT from at least one preset port of the optical splitter, the port corresponding to the first ONU.

5. The method according to claim 1, wherein when N is greater than L, the determining, by the OLT based on the optical power values of the optical signals corresponding to all of the N wavelengths, information about the optical splitter port corresponding to the first ONU comprises:
    when differences between the optical power values of the optical signals corresponding to the N wavelengths comprise a difference greater than a threshold, determining, by the OLT, L largest optical power values from the optical power values of the optical signals corresponding to the N wavelengths, wherein the optical power values of the optical signals corresponding to the N wavelengths comprise the optical power values of the optical signals that are of all of the N wavelengths and that are received by the first ONU, and L is a positive integer;

determining, by the OLT, optical signal wavelengths that are in a one-to-one correspondence with the L optical power values, to obtain L wavelengths; and determining, by the OLT based on the L wavelengths, the information about the optical splitter port corresponding to the first ONU.

6. The method according to claim 5, wherein optical signals corresponding to the L wavelengths are transmitted to the first ONU by using an optical distribution network (ODN), at least one optical splitter is disposed in the ODN, transmittance points are disposed at a plurality of branch ends of each of the at least one optical splitter, and the transmittance point is configured to transmit an optical signal of a second preset wavelength; and wherein the determining, by the OLT based on the L wavelengths, the information about the optical splitter port corresponding to the first ONU comprises:

determining, by the OLT, information about at least one transmittance point based on information about the L wavelengths that is fed back by the first ONU, wherein the at least one transmittance point transmits the optical signals corresponding to the L wavelengths; and determining, by the OLT based on the information about the at least one transmittance point, the information about the optical splitter port corresponding to the first ONU.

7. A port detection method, comprising:

receiving, by an optical network unit (ONU), optical signals corresponding to all of N wavelengths, wherein the N wavelengths are different from each other, and N is a positive integer;

determining, by the ONU, optical power values of the received optical signals corresponding to all of the N wavelengths;

generating, by the ONU, at least one piece of feedback information based on the optical power values of the optical signals corresponding to all of the N wavelengths; and sending, by the ONU, the at least one piece of feedback information to an optical line terminal (OLT), wherein the at least one piece of feedback information comprises the optical power values of the optical signals corresponding to all of the N wavelengths, K smallest optical power values, K wavelengths corresponding to the K optical power values, L largest optical power values, or L wavelengths corresponding to the L optical power values, and K and L are positive integers not greater than N.

8. The method according to claim 7, wherein when N is greater than K, the generating, by the ONU, at least one piece of feedback information based on the optical power values of the optical signals corresponding to all of the N wavelengths comprises:

when differences between the optical power values of the optical signals corresponding to the N wavelengths comprise a difference greater than a threshold, determining, by the ONU, K smallest optical power values from the optical power values of the optical signals corresponding to the N wavelengths, wherein the optical power values of the optical signals corresponding to the N wavelengths comprise the optical power values of the optical signals that are of all of the N wavelengths and that are received by the ONU, and K is a positive integer;

determining, by the ONU, optical signal wavelengths that are in a one-to-one correspondence with the K optical power values, to obtain K wavelengths;

determining, by the ONU based on the K wavelengths, information about an optical splitter port corresponding to the ONU; and generating, by the ONU, the at least one piece of feedback information, wherein the at least one piece of feedback information comprises the information about the optical splitter port corresponding to the ONU.

9. The method according to claim 8, wherein optical signals corresponding to the K wavelengths are transmitted to the ONU by using an optical distribution network (ODN), at least one optical splitter is disposed in the ODN, reflection points are disposed at a plurality of branch ends of each of the at least one optical splitter, and the reflection point is configured to reflect an optical signal of a first preset wavelength; and wherein the determining, by the ONU based on the K wavelengths, information about an optical splitter port corresponding to the ONU comprises:

determining, by the ONU, information about at least K reflection points based on the K wavelengths, wherein each of the at least K reflection points reflects an optical signal corresponding to one of the K wavelengths; and determining, by the ONU based on the information about the at least K reflection points, the information about the optical splitter port corresponding to the ONU.

10. The method according to claim 7, wherein when N is greater than L, the generating, by the ONU, at least one piece of feedback information based on the optical power values of the optical signals corresponding to all of the N wavelengths comprises:

when differences between the optical power values of the optical signals corresponding to the N wavelengths comprise a difference greater than a threshold, determining, by the ONU, L largest optical power values from the optical power values of the optical signals corresponding to the N wavelengths, wherein the optical power values of the optical signals corresponding to the N wavelengths comprise the optical power values of the optical signals that are of all of the N wavelengths and that are received by the ONU, and L is a positive integer;

determining, by the ONU, optical signal wavelengths that are in a one-to-one correspondence with the L optical power values, to obtain L wavelengths;

determining, by the ONU based on the L wavelengths, information about an optical splitter port corresponding to the ONU; and generating, by the ONU, the at least one piece of feedback information, wherein the at least one piece of feedback information comprises the information about the optical splitter port corresponding to the ONU.

11. The method according to claim 10, wherein optical signals corresponding to the L wavelengths are transmitted to the ONU by using an optical distribution network (ODN), at least one optical splitter is disposed in the ODN, transmittance points are disposed at a plurality of branch ends of each of the at least one optical splitter, and the transmittance point is configured to transmit an optical signal of a second preset wavelength; and wherein the determining, by the ONU based on the L wavelengths, information about an optical splitter port corresponding to the ONU comprises:

determining, by the ONU, information about at least one transmittance point based on the L wavelengths, wherein the at least one transmittance point transmits the optical signals corresponding to the L wavelengths; and determining, by the ONU based on the information about the at least one transmittance point, the information about the optical splitter port corresponding to the ONU.

12. An optical network device, comprising a transceiver and a processor, wherein:
- the transceiver is configured to receive optical power values that are of optical signals corresponding to all of N wavelengths and that are sent by a first optical network unit (ONU), wherein the N wavelengths are wavelengths of optical signals received by the first ONU, the N wavelengths are different from each other, and N is a positive integer; and
- the processor is configured to determine, based on the optical power values of the optical signals corresponding to all of the N wavelengths, information about an optical splitter port corresponding to the first ONU.

13. The optical network device according to claim 12, wherein the processor is specifically configured to:
- when N is greater than K, and differences between the optical power values of the optical signals corresponding to the N wavelengths comprise a difference greater than a threshold, determine K smallest optical power values from the optical power values of the optical signals corresponding to the N wavelengths, wherein the optical power values of the optical signals corresponding to the N wavelengths comprise the optical power values of the optical signals that are of all of the N wavelengths and that are received by the first ONU, and K is a positive integer;
- determine optical signal wavelengths that are in a one-to-one correspondence with the K optical power values, to obtain K wavelengths; and
- determine, based on the K wavelengths, the information about the optical splitter port corresponding to the first ONU.

14. The optical network device according to claim 13, wherein optical signals corresponding to the K wavelengths are transmitted to the first ONU by using an optical distribution network (ODN), at least one optical splitter is disposed in the ODN, reflection points are disposed at a plurality of branch ends of each of the at least one optical splitter, and the reflection point is configured to reflect an optical signal of a first preset wavelength; and
- wherein the processor is specifically configured to:
- determine information about at least K reflection points based on the K wavelengths, wherein each of the at least K reflection points reflects an optical signal of one of the K wavelengths; and
- determine, based on the information about the at least K reflection points, the information about the optical splitter port corresponding to the first ONU.

15. An optical network device, comprising a transceiver and a processor, wherein:
- the transceiver is configured to receive optical signals corresponding to all of N wavelengths, wherein the N wavelengths are different from each other, and N is a positive integer;
- the processor is configured to determine optical power values of the received optical signals corresponding to all of the N wavelengths;
- the processor is further configured to generate at least one piece of feedback information based on the optical power values of the optical signals corresponding to all of the N wavelengths; and
- the transceiver is further configured to send the at least one piece of feedback information to an optical line terminal (OLT),
- wherein the at least one piece of feedback information comprises the optical power values of the optical signals corresponding to all of the N wavelengths, K smallest optical power values, K wavelengths corresponding to the K smallest optical power values, L largest optical power values, or L wavelengths corresponding to the L largest optical power values, and K and L are positive integers not greater than N.

16. The optical network device according to claim 15, wherein when N is greater than K, the processing unit is specifically configured to:
- when differences between the optical power values of the optical signals corresponding to the N wavelengths comprise a difference greater than a threshold, determine K smallest optical power values from the optical power values of the optical signals corresponding to the N wavelengths, wherein the optical power values of the optical signals corresponding to the N wavelengths comprise the optical power values of the optical signals that are of all of the N wavelengths and that are received by the optical network device, and K is a positive integer;
- determine optical signal wavelengths that are in a one-to-one correspondence with the K optical power values, to obtain K wavelengths;
- determine, based on the K wavelengths, information about an optical splitter port corresponding to the optical network device; and
- generate the at least one piece of feedback information, wherein the at least one piece of feedback information comprises the information about the optical splitter port corresponding to the optical network device.

17. The optical network device according to claim 16, wherein optical signals corresponding to the K wavelengths are transmitted to the ONU by using an optical distribution network (ODN), at least one optical splitter is disposed in the ODN, reflection points are disposed at a plurality of branch ends of each of the at least one optical splitter, and the reflection point is configured to reflect an optical signal of a first preset wavelength; and
- wherein the processor is specifically configured to:
- determine information about at least K reflection points based on the K wavelengths, wherein each of the at least K reflection points reflects an optical signal corresponding to one of the K wavelengths; and
- determine, based on the information about the at least K reflection points, the information about the optical splitter port corresponding to the ONU.

18. The optical network device according to claim 15, wherein when N is greater than L, the generating, by the ONU, at least one piece of feedback information based on the optical power values of the optical signals corresponding to all of the N wavelengths comprises:
- when differences between the optical power values of the optical signals corresponding to the N wavelengths comprise a difference greater than a threshold, determining, by the ONU, L largest optical power values from the optical power values of the optical signals corresponding to the N wavelengths, wherein the optical power values of the optical signals corresponding to the N wavelengths comprise the optical power values of the optical signals that are of all of the N wavelengths and that are received by the ONU, and L is a positive integer;

determining, by the ONU, optical signal wavelengths that are in a one-to-one correspondence with the L optical power values, to obtain L wavelengths;

determining, by the ONU based on the L wavelengths, information about an optical splitter port corresponding to the ONU; and generating, by the ONU, the at least one piece of feedback information, wherein the at least one piece of feedback information comprises the information about the optical splitter port corresponding to the ONU.

19. A passive optical network (PON) system, comprising:

an optical distribution network (ODN); and at least one optical network unit (ONU), wherein the at least one ONU is respectively connected to at least one port of the ODN, and each of the at least one ONU is connected to a different port of the ODN;

wherein the ODN comprises at least one optical splitter;

wherein reflection points are disposed on a plurality of ports of each of the at least one optical splitter, and the reflection point is configured to reflect an optical signal of a first preset wavelength; and wherein a first ONU of the at least one ONU is configured to:

receive optical signals corresponding to all of N wavelengths, wherein the N wavelengths are different from each other, and N is a positive integer;

determine optical power values of the received optical signals corresponding to all of the N wavelengths;

generate at least one piece of feedback information based on the optical power values of the optical signals corresponding to all of the N wavelengths; and to send the at least one piece of feedback information to an optical line terminal (OLT), wherein the at least one piece of feedback information comprises the optical power values of the optical signals corresponding to all of the N wavelengths, K smallest optical power values, K wavelengths corresponding to the K smallest optical power values, L largest optical power values, or L wavelengths corresponding to the L largest optical power values, and K and L are positive integers not greater than N.

20. The PON system according to claim 19, further comprising:

the OLT, wherein the OLT is configured to:

receive the optical power values that are of the optical signals corresponding to all of N wavelengths and that are sent by the first optical network unit (ONU); and determine, based on the optical power values of the optical signals corresponding to all of the N wavelengths, information about an optical splitter port corresponding to the first ONU.

* * * * *